United States Patent
Emge et al.

(10) Patent No.: US 12,258,437 B2
(45) Date of Patent: Mar. 25, 2025

(54) COMPACT POLYURETHANE

(71) Applicant: BASF SE, Ludwigshafen am Rhein (DE)

(72) Inventors: Andreas Emge, Lemfoerde (DE); Andre Meyer, Lemfoerde (DE); Sirus Zarbakhsh, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 860 days.

(21) Appl. No.: 17/416,032

(22) PCT Filed: Dec. 19, 2019

(86) PCT No.: PCT/EP2019/086432
§ 371 (c)(1),
(2) Date: Jun. 18, 2021

(87) PCT Pub. No.: WO2020/127814
PCT Pub. Date: Jun. 25, 2020

(65) Prior Publication Data
US 2022/0064365 A1    Mar. 3, 2022

(30) Foreign Application Priority Data
Dec. 20, 2018 (EP) .................................. 18214431

(51) Int. Cl.
| | |
|---|---|
| C08G 18/76 | (2006.01) |
| C03C 25/16 | (2006.01) |
| C03C 25/326 | (2018.01) |
| C08G 18/32 | (2006.01) |
| C08G 18/48 | (2006.01) |
| C08G 18/65 | (2006.01) |
| C08G 18/79 | (2006.01) |
| C08G 65/26 | (2006.01) |

(52) U.S. Cl.
CPC .......... *C08G 18/7671* (2013.01); *C03C 25/16* (2013.01); *C03C 25/326* (2013.01); *C08G 18/3206* (2013.01); *C08G 18/4845* (2013.01); *C08G 18/6517* (2013.01); *C08G 18/797* (2013.01); *C08G 65/2654* (2013.01)

(58) Field of Classification Search
CPC .......... C08G 18/7671; C08G 18/3206; C08G 18/4845; C08G 18/6517; C08G 18/797; C08G 65/2654; C03C 25/16; C03C 25/326
See application file for complete search history.

(56) References Cited

U.S. PATENT DOCUMENTS

| | | | |
|---|---|---|---|
| 3,464,935 A | 8/1969 | Sepkoski et al. | |
| 3,928,258 A * | 12/1975 | Alexander | C08G 18/4804 521/914 |
| 6,531,566 B1 | 3/2003 | Satake | |
| 6,831,112 B2 | 12/2004 | Kaku et al. | |
| 9,399,324 B2 | 7/2016 | Bertucelli et al. | |
| 10,829,582 B2 | 11/2020 | Ferencz et al. | |
| 2007/0173628 A1 | 7/2007 | Ruppel et al. | |
| 2007/0219282 A1 | 9/2007 | Harre et al. | |
| 2011/0014480 A1 | 1/2011 | Fader | |
| 2011/0054140 A1 | 3/2011 | Krause et al. | |
| 2017/0260320 A1* | 9/2017 | Bokern | C08G 18/5024 |

FOREIGN PATENT DOCUMENTS

| | | |
|---|---|---|
| DE | 102008021980 A1 | 11/2009 |
| EP | 0090444 A2 | 10/1983 |
| EP | 1803756 A1 * | 7/2007 .......... B01D 63/023 |
| JP | 2004149719 A | 5/2004 |
| JP | 2014122332 A | 7/2014 |
| JP | 2014520905 A | 8/2014 |
| JP | 2014167105 A | 9/2014 |
| JP | 2017514965 A | 6/2017 |
| WO | 2005090440 A1 | 9/2005 |
| WO | 2006034800 A1 | 4/2006 |
| WO | 2009115540 A2 | 9/2009 |
| WO | 2016064698 A1 | 4/2016 |

OTHER PUBLICATIONS

International Search report for corresponding PCT/EP2019/086432 mailed Mar. 25, 2020, 2 Pages.
Toru Miyajima et al., "Synthesis and process development of polyether polyol with high primary hydroxyl content using a new propoxylation catalyst", Polymer Journal, Band 47, Nr. 12, Aug. 26, 2015 (Aug. 26, 2015), Seite 771-778.
M. Ionescu, Chemistry and Technology of Polyols for Polyurethanes, Rapra, 2005, Table of Contents and pp. 245-249.

(Continued)

*Primary Examiner* — Doris L Lee
(74) *Attorney, Agent, or Firm* — Armstrong Teasdale LLP

(57) ABSTRACT

Described herein is a compact polyurethane having a density of ≥850 g/l, obtainable by reacting at least the components:
  i) a polyisocyanate composition; and
  ii) a polyol composition, including at least one polyether polyol (ii.1) which
    is obtainable by reacting
    ii.1.1) a polyol starter with a functionality of 3 to 6 with
    ii.1.2) propylene oxide and/or butylene oxide,
    in the presence of a boron-based, fluorine-containing Lewis acid catalyst (ii.1.3), where the polyether polyol (ii.1) has an equivalent molecular weight of 50 to 150 g/mol, and
    ii.1.4) optionally further auxiliaries and/or additives.
Also described herein are a process for producing such a compact polyurethane and compact polyurethanes obtainable by this process. Also described herein is a method of using such a compact polyurethane for the production of a fiber composite. Also described herein are a corresponding fiber composite material and a process for producing such a fiber composite.

20 Claims, No Drawings

(56) References Cited

OTHER PUBLICATIONS

M. Ionescu, Chemistry and Technology of Polyols for Polyurethanes, Rapra, 2005, Table of Contents and pp. 64-75.
Thomas Brock et al: Lehrbuch der Lacktechnologie. 2000, pp. 165-170. Cited in specification, no English translation available.
Kunststoffhandbuch 7, "Polyurethane", 1993, Chapter 3, pp. 57-127. Cited in specification, no English translation available.
M. Ionescu, Chemistry and Technology of Polyols for Polyurethanes, Rapra, 2005, Table of Contents and pp. 119-148.
M. Neitzel et al., Handbuch Verbundwerkstoffe, 2004, pp. 164-165. Cited in specification, no English translation available.

* cited by examiner

COMPACT POLYURETHANE

CROSS-REFERENCE TO RELATED APPLICATIONS

This application is a U.S. National Phase Application of International Patent Application No. PCT/EP2019/086432, filed Dec. 19, 2019, which claims priority to European Patent Application No. 18214431.1, filed Dec. 20, 2018, the entire contents of which are hereby incorporated by reference herein.

FIELD OF INVENTION

The present invention relates to a compact polyurethane having a density of ≥850 g/l, obtained or obtainable by reacting at least the components: i) polyisocyanate composition; ii) polyol composition, comprising at least one polyether polyol (ii.1) which is obtained or obtainable by reacting (ii.1.1) a polyol starter with a functionality of 3 to 6 with (ii.1.2) propylene oxide and/or butylene oxide, in the presence of a boron-based, fluorine-containing Lewis acid catalyst (ii.1.3), wherein the polyether polyol (ii.1) has an equivalent molecular weight of 50 to 150 g/mol, and optionally further auxiliaries and/or additives (ii.1.4). The invention additionally relates to a process for producing such a compact polyurethane and to compact polyurethane obtained or obtainable by this process. The invention further relates to the use of such a compact polyurethane having a density of ≥850 g/l for the production of a fiber composite. The invention also relates to a corresponding fiber composite material and to a process for producing such a fiber composite.

BACKGROUND

Polyurethanes (PU) are produced in a multiplicity of processing operations and are used in a large number of different applications (Guenter Oertel, Polyurethane Handbook: Chemistry—Raw Materials—Processing—Application—Properties—1. January 1994). Rigid, compact and/or fiber-reinforced polyurethanes are produced from high-functionality polyols having a high hydroxyl number (U.S. Pat. No. 3,464,935 A) and are highly crosslinked polymers. They should in general have a long processing time in the range from 30 to 240 minutes, which excludes the use of very reactive starting materials. In terms of material properties, a high impact resistance in combination with a high hardness and tensile and flexural strength are required, a combination of properties which is difficult to achieve. It has in addition been found that compact polyurethanes which are produced using customary alkylene oxide-based polyether polyols or OH-terminated polyesterols (polyester polyols) in an environment with a high atmospheric humidity have large bubbles and defects on the component surface, in particular when fiber composite materials are produced under these conditions. The cause of the defects is the presence of moisture in the air and on the fibers, which leads to an undesired reaction with the polyurethane reaction mixture. For this reason, among others, it is currently preferable in corresponding processes to use resins such as epoxies or unsaturated polyesters/vinyl esters instead of polyurethanes.

With regard to the properties sought, catalysts are typically used for the preparation of the polyether polyols and polyesterols required. On the industrial scale, basic catalysts are used for the preparation of polyetherols, and KOH is most widely used (M. Ionescu, Chemistry and Technology of Polyols, Rapra, 2005, p. 119 ff.). EP 1 803 756 A1 describes polyols obtained by the reaction of polyfunctional starters with propylene oxide; there is no mention of catalysts for the reaction. A reaction product of sorbitol (initiator) and propylene oxide is produced. In the absence of cationic catalysts, the polyol obtained has primarily secondary hydroxyl groups, which, compared to polyols which have a higher proportion of primary hydroxyl groups as a result of the use of Lewis acids as catalyst, results in a different profile in terms of reactivity and hydrophobicity. In addition, the polyols used in EP 1 803 756 A1 are highly viscous, for instance the viscosities are in the range of approx. 10 000 MPas (25° C.), which results in again much higher viscosities for the prepolymers. Such a high viscosity of the resin is disadvantageous when used as fiber composite material: the flow rate during the impregnation of the fibers is inversely proportional to the viscosity (Darcy's law) (see M. Neitzel, P. Mitschang, Handbuch Verbundwerkstoffe [Handbook of Composite Materials], Carl Hanser Verlag 2004, p. 164). Polyurethanes produced from the polyols of EP 1 803 756 A1 have fundamental differences in terms of their morphology compared to polyurethanes produced using polyols having more primary hydroxyl groups. It is for instance to be expected for polymers produced according to EP 1 803 756 A1 that these, as a result also of the prepolymer mixture used, consist of high-functionality regions (the former prepolymer) which are loosely linked to each other with a low level of crosslinking.

Polyetherols are known which have been prepared via a Lewis acid- or superacid-catalyzed alkoxylation. A challenge with this reaction regime is the formation of considerable amounts of by-products in the form of undesirable cyclic ethers which have no hydroxyl groups and therefore do not participate in the formation of the polyurethane and can lead to unpleasant odors of the products (M. Ionescu, Chemistry and Technology of Polyols, Rapra, 2005, pp. 245-247).

Polyetherols are known for which tris(pentafluorophenyl) borane (TPB) has been used as alkoxylation catalyst instead of the commonly used catalysts from the group of the alkali metals or amines (T. Miyajima et al., Polymer Journal (2015) 47, 771-778). When propylene oxide is used, these polyols have a high content of primary hydroxyl groups and are therefore much more reactive than the commonly used polyetherols with the same composition.

WO 2016/064698 A1 describes the preparation of polyols having high molecular weights of more than 2500 g/mol and a high content of primary hydroxyl groups using a dual catalyst in a two-stage alkoxylation process.

U.S. Pat. No. 6,531,566 B1 relates to polyoxyalkylene polyols or monools having a high content of primary hydroxyl groups and to the use thereof in the production of thermosetting resins, wherein the examples disclose reacting glycerol-propylene oxide adducts with further propylene oxide with the addition of tris(pentafluorophenyl)borane, and then reacting these with isocyanates to afford urethane foams or polyurethane elastomers.

U.S. Pat. No. 6,831,112 B2 describes polyether polyols which have been produced using ethylene oxide (EO) and the use of these for the production of rigid polyurethane foams. In the examples, a propylene oxide-glycerol adduct is reacted with further propylene oxide (PO) and ethylene oxide in the presence of tris(pentafluorophenyl)borane and used for the production of polyurethane elastomers and foams.

JP 2014-167105 A discloses examples of glycerol-started polyols which are exclusively propoxylated using tris(pentafluorophenyl)borane (TPB) and have a hydroxyl number (OHN) of 270 mg KOH/g.

US 2003/0100623 A1 discloses polyols based on sorbitol (+9 PO and 1 EO) having an OHN of 450 mg KOH/g, and also analogous polyols having the same OHN based on glycerol, pentaerythritol, which are exclusively alkoxylated using TPB, with almost exclusively propylene oxide being used. In all examples, the TPB catalyst is then removed. The document also describes the use for producing rigid foams which are foamed with water. A polyurethane is thus described that both expands and crosslinks in the production process. In this case, the crosslinker must be miscible with a certain amount of water and with other hydrophilic polyols, which results in a material which is hydrophilic overall but which in addition is also still brittle.

According to the prior art, therefore, TPB catalysis is largely used to produce long-chain polyetherols which are intended to have increased reactivity. These polyols are used in combination with water as blowing agent for the production of foams. The corresponding polyols—inter alia by using EO—must be sufficiently hydrophilic that water is miscible with them. The known crosslinked polyurethanes using TPB-catalyzed polyols are rigid foams which are not known for their good impact resistance.

The use of the TPB-catalyzed polyols for the production of compact, rigid polyurethanes appears to be of little promise on account of the hydrophilicity. For compact polyurethanes and fiber composite materials, which in addition to high hydrophobicity also need to have a long processing time, the increased reactivity is unattractive. The use of TPB polyols for the production of highly crosslinked, hydrophobic, compact polyurethanes did therefore not appear to be obvious.

DESCRIPTION

An object of the invention was that of providing crosslinked, compact PU materials in the case of which the crosslinker is water-repellent and miscible with hydrophobic polyols rather than with hydrophilic polyols. The PU materials should be processible to give bubble-free, compact products even in the case of very high atmospheric humidity and should at the same time be impact resistant and not brittle like for example rigid foams.

The object was achieved with a compact polyurethane having a density of ≥850 g/l, obtained or obtainable by reacting at least the components:
  i) polyisocyanate composition;
  ii) polyol composition, comprising at least one polyether polyol (ii.1) which is obtained or obtainable by reacting
    ii.1.1) a polyol starter with a functionality of 3 to 6 with
    ii.1.2) propylene oxide and/or butylene oxide,
    in the presence of a boron-based, fluorine-containing Lewis acid catalyst (ii.1.3), wherein the polyether polyol (ii.1) has an equivalent molecular weight of 50 to 150 g/mol,
    ii.1.4) optionally further auxiliaries and/or additives.

All figures concerning the density of the compact polyurethane relate in each case to the pure polyurethane resin without taking fillers into account, the density being determined according to DIN EN ISO 1183-1 by the buoyancy method. If in accordance with the elucidations concerning (ii.1.4) fillers or fibers are used, the reported densities for the polyurethanes according to the invention change according to the amount and the density of the fillers used.

Compact Polyurethane

According to the invention, as per (ii.1.1), the polyol starter used is at least one polyol with a functionality of 3 to 6, preferably 3 or 4, with mixtures of two or more of these polyols also being encompassed according to the invention. A "polyol with a functionality of 3 to 6" is understood to mean a polyol which on average has in the range from 2.8 to 3.0, or in the range from 3.8 to 4.0, or in the range from 4.8 to 5.0, or in the range from 5.8 to 6.0, hydroxyl groups per molecule. Likewise, a "polyol with a functionality of 3 or 4" is understood to mean a polyol which on average has in the range from 2.8 to 3.0, or in the range from 3.8 to 4.0, hydroxyl groups per molecule. In practice, there is a deviation from the nominal functionality since various side reactions during the polyol synthesis can lead to a functionality that can actually be lower than nominally assumed (M. Ionescu, Chemistry and Technology of Polyols, Rapra, 2005, pp 67-75). In the range of the equivalent molecular weight from 50 to 150 g/mol, it is assumed that the functionality is very close to 3 or 4 or 5 or 6, preferably is very close to 3 or 4.

The equivalent molecular weight (EMW) is defined as the quotient of the molecular weight of the polyether polyol (M(polyether polyol)) and the functionality (F) of the polyether polyol:

$$EMW = M(\text{polyether polyol})/F \ [g]$$

For example, for one mole of glycerol which has been alkoxylated with one mole of propylene oxide, an EMW of 50 g/eq results based on EMW=(150.2 g/mol)/(3 mol$^{-1}$).

In one embodiment of the compact polyurethane, the boron-based, fluorine-containing Lewis acid catalyst of (ii.1.3) has the formula BR$^1$R$^2$R$^3$, wherein R$^1$, R$^2$ and R$^3$ are each independently selected from the group consisting of fluorine atom, perfluorinated C1 to C10 alkyl radical and perfluorinated C6 to C12 aryl radical, wherein R$^1$, R$^2$ and R$^3$ are preferably identical, wherein the boron-based, fluorine-containing Lewis acid catalyst of (ii.1.3) is more preferably selected from boron trifluoride (BF$_3$), tris(pentafluorophenyl)borane (C$_6$F$_5$)$_3$B and mixtures of BF$_3$ and (C$_6$F$_5$)$_3$B, more preferably is tris(pentafluorophenyl)borane. The use of the boron-based, fluorine-containing Lewis acid catalyst of (ii.1.3) in the reaction of polyol starter with a functionality of 3 to 6 (ii.1.1) and propylene oxide and/or butylene oxide (ii.1.2) has the result that ≥50% of the hydroxyl groups present in the polyether polyol (ii.1) are primary hydroxyl groups, that is to say that at most 50% of the hydroxyl groups formed are secondary hydroxyl groups, based in each case on the entirety of all hydroxyl groups in the polyether polyol (ii.1).

In one embodiment of the compact polyurethane, the polyether polyol (ii.1) has a hydroxyl number of more than 400 mg KOH/g, preferably of more than 450 mg KOH/g, more preferably a hydroxyl number in the range from 400 to 1200 mg KOH/g, more preferably in the range from 450 to 1200 mg KOH/g, more preferably in the range from 450 to 1000 mg KOH/g.

In one embodiment of the compact polyurethane, the polyether polyol (ii.1) has an equivalent molecular weight in the range from 50 to 140 g/mol, preferably in the range from 55 to 135 g/mol, more preferably in the range from 60 to 130 g/mol.

For example, the hydroxyl number (OHN) is 405 mg KOH/g or the equivalent molecular weight is 134 g if m, n and o=6 in the triol of formula (I). An OHN of 1256 mg KOH/g or an equivalent molecular weight of 45 g is obtained for TMP if l, m, n, o=1 in the triol of formula (I).

In one embodiment of the compact polyurethane, the polyol starter (ii.1.1) of the polyether polyol (ii.1) is a triol with a functionality of 3, preferably a triol with a functionality of 3 with the exception of glycerol, more preferably a triol of the formula (I)

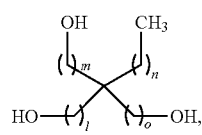

(I)

where l, m, n and o are each independently an integer from the range from 1 to 6.

In one embodiment of the compact polyurethane, l, m, n and o of the at least one triol (ii.1.1) of the formula (I) are each independently an integer from the range from 1 to 3, preferably l, m, n and o are all 1. In one embodiment of the compact polyurethane, the triol (ii.1.1) has a hydroxyl number in the range from 200 to 2000 mg KOH/g, preferably in the range from 300 to 1850 mg KOH/g, more preferably in the range from 400 to 1850 mg KOH/g.

In one embodiment of the compact polyurethane, the polyether polyol (ii.1) has no ethylene oxide-based end groups, preferably has exclusively propylene oxide-based end groups and/or butylene oxide-based end groups. In one embodiment of the compact polyurethane, the polyether polyol (ii.1) has exclusively propylene oxide-based end groups and/or butylene oxide-based end groups and comprises no ethylene oxide-based groups. In one embodiment of the compact polyurethane, the polyether polyol (ii.1) is produced only by the reaction of a polyol starter, in particular triol, (ii.1.1) and propylene oxide and/or butylene oxide (ii.1.2), preferably only by the reaction of triol (ii.1.1) and propylene oxide, and no further alkylene oxide is used. Even when not using ethylene oxide or when using exclusively propylene oxide and/or butylene oxide, the use of the boron-based, fluorine-containing Lewis acid catalyst (ii.1.3) according to the invention results in the at least one polyether polyol (ii.1) having ≥50% primary hydroxyl groups, that is to say that at most 50% of the hydroxyl groups in the polyether polyol (ii.1) are secondary hydroxyl groups, based in each case on the entirety of all hydroxyl groups in the polyether polyol (ii.1).

In one embodiment of the compact polyurethane, the polyether polyol (ii.1) is based on a triol with the exception of glycerol, preferably on a triol (ii.1.1) of the formula (I) as described above; the polyether polyol (ii.1) preferably has the formula (II)

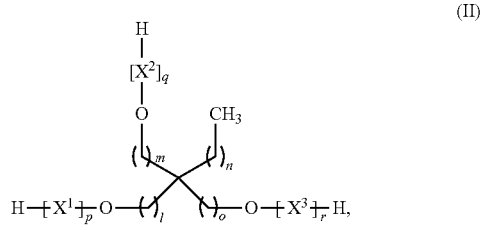

(II)

where
l, m, n and o are each independently an integer from the range from 1 to 6;
p, q and r are each independently zero or an integer from the range from 1 to 6, preferably zero or an integer from the range from 1 to 4, more preferably zero or an integer from the range from 1 to 3; and
$X^1$, $X^2$ and $X^3$ are each independently a —$CH_2$—CH($CH_3$)—O— group or a —$CH_2$—CH($CH_2$—$CH_3$)—O— group. Preferably, $X^1$, $X^2$ and $X^3$ are each a —$CH_2$—CH($CH_3$)—O— group. Preferably, l, m, n and o are all 1 and p, q and r independently take values from 0 to 2.

In one embodiment of the compact polyurethane, the reaction of (ii.1.1) and (ii.1.2) is performed exclusively in the presence of a boron-based, fluorine-containing Lewis acid catalyst (ii.1.3) and no further alkoxylation catalysts are used.

In one embodiment of the compact polyurethane, the reaction of (ii.1.1) and (ii.1.2) is performed exclusively in the presence of a boron-based, fluorine-containing Lewis acid catalyst (ii.1.3) in a single-stage synthesis step. The boron-based, fluorine-containing Lewis acid catalyst can optionally be removed after synthesis of the polyetherol, but preferably remains in the product.

The at least one polyether polyol (ii.1) is preferably present in the polyol composition of (ii) to an extent of 25% to 95% by weight, based on the total weight of the polyol composition of (ii). In one embodiment of the compact polyurethane, the polyether polyol (ii.1) is used in 10% to 50% by weight, based on a total weight of polyisocyanate composition (i) and polyol composition (ii) of 100% by weight. Polyisocyanate composition (i) and polyol composition (ii) are preferably used in a ratio such that the molar ratio of the sum total of the functionalities of the polyol composition (ii) used to the sum total of the functionalities of the polyisocyanate composition (i) used is in the range from 0.7 to 2.1. The ratio is preferably in the range from 0.8 to 1.2. A ratio of 1:1 here corresponds to an isocyanate index of 100.

Surprisingly, it has been found that the use of a polyol which had been produced by propoxylation from a triol, in particular TMP, under catalysis by a boron-based, fluorine-containing Lewis acid catalyst, in particular tris(pentafluorophenyl)borane, resulted in compact polyurethanes having an improved impact resistance of more than 60 kJ/m², in particular more than 70 kJ/m². In addition, the Shore D hardness was comparable to that of polyurethanes which had been produced using different polyols produced with KOH catalysis. Surprisingly, the compact polyurethanes which had been produced using a polyol which by propoxylation from a triol, in particular TMP, under catalysis by a boron-based, fluorine-containing Lewis acid catalyst, in particular tris(pentafluorophenyl)borane, had markedly improved tensile strength which was more than 80 MPa.

When producing fiber composites, it has been found in the winding test that the use of compact polyurethanes which had been produced using a polyol, which by propoxylation from a triol, in particular TMP, under catalysis by a boron-based, fluorine-containing Lewis acid catalyst, in particular tris(pentafluorophenyl)borane, was to markedly better results with respect to the avoidance of undesirable bubble formation: in the winding test it was found using the polyols according to the invention that, despite high atmospheric humidity of 85%, there was at most very minor, if any, bubble formation during the production of the corresponding components, whereas the use of polyols produced under KOH catalysis led to intense foaming, that is to say undesired bubbles formed to a great extent.

According to the invention, as per (i) a polyisocyanate composition is used. The polyisocyanate composition here comprises at least one polyisocyanate. According to the invention, the polyisocyanate composition may also comprise two or more polyisocyanates.

The at least one polyisocyanate is preferably at least one diisocyanate, more preferably selected from the group consisting of aliphatic, cycloaliphatic, araliphatic, and aromatic diisocyanates and mixtures of two or more of these diisocyanates. Specific examples include the following aromatic diisocyanates: toluene 2,4-diisocyanate, mixtures of toluene 2,4- and 2,6-diisocyanate, diphenylmethane 4,4'-, 2,4'-, and/or 2,2'-diisocyanate (MDI), mixtures of diphenylmethane 2,4'- and 4,4'-diisocyanate, urethane-, carbodiimide- or uretonimine-modified liquid diphenylmethane 4,4'- and/or 2,4-diisocyanate, 4,4'-diisocyanatodiphenylethane, mixtures of monomeric methanediphenyl diisocyanates and higher polycyclic homologs of methanediphenyl diisocyanate (polymeric MDI), naphthylene (1,2) and 1,5-diisocyanate or prepolymers of these isocyanates and polyols or isocyanates and isocyanate-reactive components. Aliphatic diisocyanates used are customary aliphatic and/or cycloaliphatic diisocyanates, for example tri-, tetra-, penta-, hexa-, hepta-, and/or octamethylene diisocyanate, 2-methylpentamethylene 1,5-diisocyanate, 2-ethylbutylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, dicyclohexylmethane 4,4'-, 2,4'- and/or 2,2'-diisocyanate, or prepolymers of these isocyanates. Isocyanate compositions comprising MDI are preferred.

Di- and polyisocyanates (i) can also be used in the form of polyisocyanate prepolymers. These polyisocyanate prepolymers are obtainable by reacting polyisocyanates (i) described above in excess, for example at temperatures of 30 to 100° C., preferably at approximately 80° C., with compounds having at least two isocyanate-reactive groups, to afford the prepolymer. The NCO content of polyisocyanate prepolymers of the invention is preferably 15% to 33% by weight of NCO, particularly preferably 25% to 30% by weight of NCO.

The polyisocyanate composition (i) has a viscosity at 25° C. in the range from 50 mPas to 1000 mPas, preferably in the range from 50 mPas to 500 mPas, more preferably in the range from 50 mPas to 300 mPas.

In one embodiment of the compact polyurethane, the polyol composition ii) comprises one or more further polyols, wherein the further polyol(s) is/are exclusively polyols which have been prepared without alkali metal-catalyzed or amine-catalyzed alkoxylation. The residual amount of alkali metal salts in the polyol composition ii) is n<0.5 ppm, based on the total weight of the polyol composition ii).

In one embodiment of the compact polyurethane, the further polyol(s) is/are selected from the group consisting of hydroxyl-functionalized hydrophobic compounds, oleochemical polyols, polyetherols (polyether polyols) which have been alkoxylated in the presence of boron-containing Lewis acids, optionally polyesterols (polyester polyols) and optionally chain extenders.

Preferably, all polyols of the polyol composition (ii) are prepared without basic or aminic catalyst. In a preferred embodiment of the compact polyurethane, the polyol composition (ii) does not comprise any aminic or basic catalysts.

Preferably, the polyol composition of (ii) comprises one or more further polyols in addition to the at least one polyether polyol (ii.1), wherein the further polyol(s) is/are selected from the group of hydroxyl-functionalized hydrophobic compounds, wherein the hydroxyl-functionalized hydrophobic compounds have hydrocarbon groups having preferably more than 6, particular preferably more than 8 and less than 100 and in particular more than 10 and less than 50 carbon atoms and one or more hydroxyl groups. Compounds used having at least two isocyanate-reactive groups may for example be polyetherols or polyesterols. It is preferable when compounds used having at least two isocyanate-reactive groups are polyetherols or polyesterols comprising secondary OH groups, an example being polypropylene oxide. The polyetherols or polyesterols here preferably have a functionality of 2 to 4, particularly preferably of 2 to 3, and a proportion of secondary OH groups of at least 50%, preferably at least 75% and in particular at least 85%. Compounds used having on average at least 1.5 isocyanate-reactive hydrogen atoms per molecule may be all compounds known in polyurethane chemistry having isocyanate-reactive hydrogen atoms.

Examples of oleochemical polyols are described, inter alia, in M. Ionescu, Chemistry and Technology of Polyols, Rapra, 2005, chapter 17.1. As such hydroxyl-functionalized hydrophobic compound, a hydroxyl-functionalized oleochemical compound, i.e. an oleochemical polyol, is preferably used. In one embodiment of the oleochemical polyol, castor oil (triglyceride mixture) and derivatives thereof are used. Preferred derivatives are reaction products with alkylene oxides or ketone-formaldehyde resins. The latter compounds are marketed, for example, by Covestro AG under the name Desmophen® 1150. Another group of oleochemical polyols used with preference can be obtained via ring-opening of epoxidized fatty acid esters with simultaneous reaction with alcohols and optionally with subsequent further transesterification reactions. Incorporation of hydroxyl groups into oils and fats is primarily achieved via epoxidation of the olefinic double bond present in these products and subsequent reaction of the resultant epoxide groups with a mono- or polyhydric alcohol. The epoxide ring here becomes a hydroxyl group or, in the case of polyfunctional alcohols, a structure with a larger number of OH groups. Because oils and fats are mostly glycerol esters, the abovementioned reactions are also accompanied by parallel transesterification reactions. The resultant compounds preferably have a molecular weight in the range between 500 and 1500 g/mol. Products of this type are supplied by way of example by BASF (as Sovermol®) or by Altropol Kunststoff GmbH as Neukapol®.

In addition, the polyol composition of (ii) can comprise polyol types known to those skilled in the art, such as polybutadienes, based on free-radically or anionically polymerized butadienes, acrylate polyols, polysiloxane polyols, polyols obtainable by Mannich condensation, aromatic polyols, for example based on bisphenol A, resorcinol, novolak or melamine. Further possibilities are polytetrahydrofurans or polycaprolactones or copolymers of these starting materials; further possibilities are polymer polyols, for example based on triols and particles based on polystyrene, styrene/acrylonitrile. All of these polyol types are known, for example, from M. Ionescu, Chemistry and Technology of Polyols, Rapra, 2005, pp. 67-75.

In one embodiment of the compact polyurethane, the polyol composition ii) comprises optionally polyetherols, prepared for example from epoxides, such as propylene oxide and/or ethylene oxide and/or butylene oxide, or from tetrahydrofuran with starter compounds having active hydrogen atoms, such as aliphatic alcohols, phenols, amines, carboxylic acids, water or compounds based on natural substances, such as sucrose, sorbitol or mannitol, using a catalyst. Mention may be made here of basic catalysts or double metal cyanide catalysts, as described for example in WO 2006/034800 A1, EP 0090444 B1 or WO 05/090440 A1.

In one embodiment of the compact polyurethane, the polyol composition ii) comprises optionally polyesterols prepared for example from aliphatic or aromatic dicarboxylic acids and polyhydric alcohols, polythioether polyols, polyesteramides, hydroxyl-containing polyacetals and/or hydroxyl-containing aliphatic polycarbonates, preferably in the presence of an esterification catalyst. Other possible polyols are set out by way of example in "Kunststoffhandbuch, Band 7, Polyurethane" [Plastics Handbook, volume 7, Polyurethanes], Carl Hanser Verlag, 3rd edition 1993, chapter 3.1. Polyester polyols may be prepared, for example, from organic dicarboxylic acids having 2 to 12 carbon atoms, preferably aliphatic dicarboxylic acids having 4 to 6 carbon atoms, and polyhydric alcohols, preferably diols, having 2 to 12 carbon atoms, preferably 2 to 6 carbon atoms. Examples of useful dicarboxylic acids include: succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids may be used here either individually or in a mixture with one another. Instead of the free dicarboxylic acids it is also possible to use the corresponding dicarboxylic acid derivatives, for example dicarboxylic esters of alcohols having 1 to 4 carbon atoms or dicarboxylic anhydrides. Preference is given to using dicarboxylic acid mixtures of succinic acid, glutaric acid and adipic acid in quantitative proportions of, for example, 20 to 35:35 to 50:20 to 32 parts by weight, and especially adipic acid. Examples of di- and polyhydric alcohols, in particular diols, are: ethanediol, diethylene glycol, propane-1,2- and -1,3-diol, dipropylene glycol, butane-1,4-diol, butane-1,2-diol, pentane-1,5-diol, hexane-1,6-diol, decane-1,10-diol, glycerol and trimethylolpropane. Preference is given to using ethanediol, diethylene glycol, butane-1,4-diol, pentane-1,5-diol, and hexane-1,6-diol. It is also possible to use polyester polyols derived from lactones, for example ε-caprolactone, or hydroxycarboxylic acids, for example ω-hydroxycaproic acid.

The polyester polyols can be prepared by polycondensing the organic, for example aromatic and preferably aliphatic, polycarboxylic acids and/or derivatives and polyhydric alcohols in a catalyst-free manner or preferably in the presence of esterification catalysts, appropriately in an atmosphere of inert gas, for example nitrogen, carbon monoxide, helium, or argon, in the melt at temperatures of 150 to 250° C., preferably 180 to 220° C., optionally under reduced pressure, down to the desired acid number which is preferably less than 10, particularly preferably less than 2. In a preferred embodiment, the esterification mixture is polycondensed at the abovementioned temperatures down to an acid number of 80 to 30, preferably 40 to 30, under standard pressure and then under a pressure of less than 500 mbar, preferably 50 to 150 mbar. Examples of esterification catalysts that may be used are iron catalysts, cadmium catalysts, cobalt catalysts, lead catalysts, zinc catalysts, antimony catalysts, magnesium catalysts, titanium catalysts, and tin catalysts in the form of metals, metal oxides or metal salts. However, the polycondensation may also be carried out in the liquid phase in the presence of diluents and/or entraining agents, for example benzene, toluene, xylene or chlorobenzene, for removal of the water of condensation by azeotropic distillation. To prepare the polyester polyols, the organic polycarboxylic acids and/or derivatives and polyhydric alcohols are advantageously polycondensed in a molar ratio of 1:1 to 1.8, preferably 1:1.05 to 1.2.

The polyester polyols obtained preferably have a functionality of 2 to 4, in particular of 2 to 3, and a number-average molecular weight of 480 to 3000, preferably 1000 to 3000 g/mol.

In one embodiment of the compact polyurethane, the polyol composition ii) comprises optionally chain extenders. The chain extenders used are substances having a molecular weight of preferably less than 450 g/mol, particularly preferably of 60 to 400 g/mol, where chain extenders have 2 isocyanate-reactive hydrogen atoms and crosslinking agents have 3 isocyanate-reactive hydrogen atoms. These may preferably be used individually or in the form of mixtures. It is preferable to use diols and/or triols having molecular weights of less than 400, particularly preferably of 60 to 300 and in particular 60 to 150. Useful examples of starter molecules include aliphatic, cycloaliphatic and/or araliphatic diols having 2 to 14, preferably 2 to 10, carbon atoms, such as monoethylene glycol, propane-1,3-diol, decane-1, 10-diol, 1,2-,1,3-, 1,4-dihydroxycyclohexane, diethylene glycol, dipropylene glycol, butane-1,4-diol, butane-1,2-diol, hexane-1,6-diol and bis(2-hydroxyethyl)hydroquinone, triols such as 1,2,4-, 1,3,5-trihydroxycyclohexane, glycerol and trimethylolpropane, and low molecular weight hydroxyl group-containing polyalkylene oxides based on ethylene oxide and/or 1,2-propylene oxide and the aforementioned diols and/or triols. As chain extenders, particular preference is given to using monoethylene glycol, butane-1,4-diol, butane-1,2-diol, diethylene glycol, glycerol or mixtures thereof.

If chain extenders and/or crosslinkers are used, the proportion of the chain extenders and/or crosslinkers is typically 1 to 50, preferably 2 to 20% by weight, based on the total weight of components (ii). However, it is also possible here to omit the chain extenders or crosslinking agents. Addition of chain extenders, crosslinking agents, or optionally also mixtures thereof, can however prove to be advantageous for modifying mechanical properties, e.g. hardness.

Auxiliaries and/or additives (ii.1.4) can optionally also be used. Any of the auxiliaries and additives known for the production of polyurethanes can be used here. Mention may be made by way of example of surface-active substances, blowing agents, foam stabilizers, cell regulators, release agents, fillers, dyes, pigments, flame retardants, hydrolysis stabilizers, and fungistatic and bacteriostatic substances. These substances are known and are described by way of example in "Kunststoffhandbuch, Band 7, Polyurethane" [Plastics Handbook, volume 7, Polyurethanes], Carl Hanser Verlag, 3rd edition 1993, chapters 3.4.4 and 3.4.6 to 3.4.11.

As additives, customary polyurethane catalysts can be used as catalysts (ii.1.4). These greatly accelerate the reaction of the compounds having isocyanate-reactive hydrogen atoms (b) with the di- and polyisocyanates (a). The following may be mentioned as examples of customary catalysts that can be used for the production of the polyurethanes: amidines, such as 2,3-dimethyl-3,4,5,6-tetrahydropyrimidine, tertiary amines, such as triethylamine, tributylamine, dimethylbenzylamine, dimethylcyclohexylamine, N-methyl-, N-ethyl- and N-cyclohexylmorpholine, N,N,N', N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis (dimethylaminopropyl)urea, dimethylpiperazine, 1,2-dimethylimidazole, 1-azabicyclo[3.3.0]octane, and preferably 1,4-diazabicyclo[2.2.2]octane, and alkanolamine compounds, such as triethanolamine, triisopropanolamine, N-methyl- and N-ethyldiethanolamine and dimethylethanolamine. It is also possible to use organic metal compounds, preferably organic tin compounds, for example tin(II) salts of organic carboxylic acids, e.g. tin(II) acetate, tin(II) octoate, tin(II) ethylhexoate and tin(II) laurate, and the dialkyltin(IV) salts of organic carboxylic acids, e.g. dibutyltin diacetate, dibutyltin dilaurate, dibutyltin maleate and dioctyltin diacetate, and also bismuth carboxylates, such as bismuth(III) neodecanoate, bismuth 2-ethylhexanoate and bismuth octanoate, or mixtures thereof. The organic metal compounds can be used alone or preferably in combination with strongly basic amines. If component (ii.1.4) is an ester, preference is given to using exclusively amine catalysts. It is also possible to use so-called latent catalysts known to those skilled in the art, which at room temperature have only little, if any, catalytic activity and are only activated for example by increasing the temperature. Examples of these catalysts can be found inter alia in DE 102008021980 A1 or WO 2009/115540 A1.

Catalysts (ii.1.4) can for example be used in a concentration of 0.001% to 5% by weight, in particular 0.05% to 2% by weight as catalyst or catalyst combination, based on the weight of component (ii).

In a further preferred embodiment, the auxiliaries and additives (ii.1.4) can comprise basic catalysts which are not customary polyurethane-forming catalysts. These comprise by way of example the catalysts that catalyze formation of polyisocyanurate. Polyisocyanurate catalysts comprise alkali metal carboxylates. These preferably comprise formates and acetates, in particular acetates, such as sodium acetate and potassium acetate.

A further type of additives (ii.1.4) are deaerators, which are known to those skilled in the art and are described, for example, in Thomas Brock, Michael Groteklaes, Peter Mischke: Lehr-buch der Lacktechnologie [Textbook of Paint Technology]. Ed.: Ulrich Zorll, 2nd edition, Vincentz Verlag, Hanover 2000, ISBN 978-3-87870-569-7, chapter 2.4.2.1, Entschäumer und Entlüfter [Defoamers and Deaerators], p. 169 f.

In a further embodiment, it is also possible to add to the polyisocyanate composition (i) such components (ii-1.4) not comprising any isocyanate-reactive hydrogen atoms.

For the purposes of the invention, the term "polyurethane" encompasses all known polyisocyanate polyaddition products. These include addition products derived from isocyanate and alcohol, and also include modified polyurethanes, which can comprise isocyanurate structures, allophanate structures, urea structures, carbodiimide structures, uretonimine structures, biuret structures, and other isocyanate addition products. These polyurethanes of the invention in particular comprise solid polyisocyanate polyaddition products, such as thermosets, and foams having an apparent density of >850 g/l based on polyisocyanate polyaddition products, in particular polyurethane coatings.

In a further preferred embodiment, the polyurethane is a solid polyurethane having a density of preferably more than 850 g/l, preferably 850 to 1400 g/l and particular preferably 850 to 1100 g/l. A solid polyurethane is obtained here, without addition of any blowing agent. In the context of the present invention, small quantities of blowing agent, for example water which is present in the polyols as a result of the production process, are not interpreted here as constituting addition of blowing agent. The reaction mixture for the production of the compact polyurethane preferably comprises less than 0.2% by weight, particularly preferably less than 0.1% by weight and in particular less than 0.05% by weight, of water. The solid polyurethane preferably comprises fillers, in particular fibrous fillers. Suitable fillers are described under (ii.1.4).

The reaction mixture is preferably produced in the two-component method. To this end, polyisocyanate composition i) and polyol composition ii) are combined. The polyisocyanate composition comprises isocyanates and optionally non-isocyanate-reactive constituents of component (ii.1.4). The composition of the polyol composition is preferably adjusted here so that it has a viscosity at 25° C. of preferably less than 2000 mPas. The viscosity measurement here is based on DIN 53019-1 to 3. The viscosity can be adjusted here in particular via the selection of the compound of component (ii.1.4) and the amount thereof used. In particular, the viscosity of the polyol component can be reduced by the use of substances known to those skilled in the art such as acrylates or plasticizers.

The reaction mixture is cured at temperatures of greater than 80° C., preferably at 80° C. to 200° C.

Process for Producing a Compact Polyurethane Having a Density of ≥850 g/l

The invention additionally relates to a process for producing a compact polyurethane having a density of ≥850 g/l, comprising the reaction of at least the components:
  i) polyisocyanate composition;
  ii) polyol composition, comprising at least one polyether polyol (ii.1) which is obtained or obtainable by reacting
    ii.1.1) a polyol starter with a functionality of 3 to 6, preferably of 3 or 4, with
    ii.1.2) propylene oxide and/or butylene oxide,
    in the presence of a boron-based, fluorine-containing Lewis acid catalyst (ii.1.3);
    wherein the polyether polyol (ii.1) has an equivalent molecular weight of 50 to 150 g/mol,
  ii.1.4) optionally further auxiliaries and/or additives.

The description already given in the section concerning the compact polyurethane applies to the polyisocyanate composition (i).

In one embodiment of the process for producing a compact polyurethane having a density of ≥850 g/l, the compact polyurethane has a density in the range from 850 to 1250 g/l, preferably a density in the range from 850 to 1100 g/l.

In one embodiment of the process for producing a compact polyurethane having a density of ≥850 g/l, the boron-based, fluorine-containing Lewis acid catalyst of (ii.1.3) has the formula $BR^1R^2R^3$, wherein $R^1$, $R^2$ and $R^3$ are each independently selected from the group consisting of fluorine atom, perfluorinated C1 to C10 alkyl radical and perfluorinated C6 to C12 aryl radical, wherein $R^1$, $R^2$ and $R^3$ are preferably identical, wherein the boron-based, fluorine-containing Lewis acid catalyst of (ii.1.3) is more preferably selected from boron trifluoride ($BF_3$), tris(pentafluorophenyl)borane ($(C_6F_5)_3B$) and mixtures of $BF_3$ and $(C_6F_5)_3B$, more preferably is tris(pentafluorophenyl)borane. The use of the boron-based, fluorine-containing Lewis acid catalyst of (ii.1.3) in the reaction of polyol starter with a functionality of 3 to 6 (ii.1.1) and propylene oxide and/or butylene oxide (ii.1.2) has the result that ≥50% of the hydroxyl groups present in the polyether polyol (ii.1) are primary hydroxyl groups, that is to say that at most 50% of the hydroxyl groups formed are secondary hydroxyl groups, based in each case on the entirety of all hydroxyl groups in the polyether polyol (ii.1).

In one embodiment of the process for producing a compact polyurethane having a density of ≥850 g/l, the polyether polyol (ii.1) has a hydroxyl number of more than 400 mg KOH/g, preferably of more than 450 mg KOH/g, more preferably a hydroxyl number in the range from 400 to 1200 mg KOH/g, more preferably in the range from 450 to 1200 mg KOH/g, more preferably in the range from 450 to 1000 mg KOH/g.

In one embodiment of the process for producing a compact polyurethane having a density of ≥850 g/l, the polyether polyol (ii.1) has an equivalent molecular weight in the range from 50 to 140 g/mol, preferably in the range from 55 to 135 g/mol, more preferably in the range from 60 to 130 g/mol.

In one embodiment of the process for producing a compact polyurethane having a density of ≥850 g/l, the polyether polyol (ii.1) is used in 10% to 50% by weight, based on a total weight of polyisocyanate composition (i) and polyol composition (ii) of 100% by weight. Polyisocyanate composition (i) and polyol composition (ii) are preferably used in a ratio such that the molar ratio of the sum total of the functionalities of the polyol composition (ii) used to the sum total of the functionalities of the polyisocyanate composition (i) used is in the range from 0.7 to 2.1. The ratio is preferably in the range from 0.8 to 1.2. A ratio of 1:1 here corresponds to an isocyanate index of 100.

In one embodiment of the process for producing a compact polyurethane having a density of ≥850 g/l, the polyol starter (ii.1.1) of the polyether polyol of (ii.1) is a triol with a functionality of 3, preferably a triol with a functionality of 3 with the exception of glycerol, more preferably a triol of the formula (I)

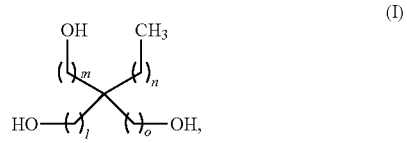

where l, m, n and o are each independently an integer from the range from 1 to 6. Preferably, l, m, n and o of the at least one triol (ii.1.1) of the formula (I) are each independently an integer from the range from 1 to 3, more preferably l, m, n and o are all 1.

In one embodiment of the process for producing a compact polyurethane having a density of ≥850 g/l, the triol (ii.1.1) has a hydroxyl number in the range from 200 to 2000 mg KOH/g, preferably in the range from 300 to 1850 mg KOH/g, more preferably in the range from 400 to 1850 mg KOH/g.

In one embodiment of the process for producing a compact polyurethane having a density of ≥850 g/l, the polyether polyol (ii.1) is based on a triol with the exception of glycerol, preferably on a triol (ii.1.1) of the formula (I) as shown above; the polyether polyol (ii.1) more preferably has the formula (II)

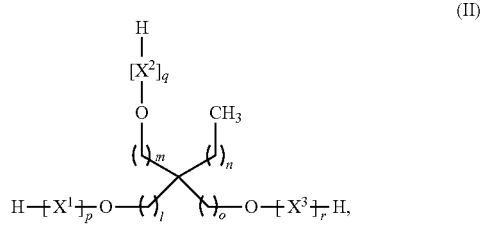

where
l, m, n and o are each independently an integer from the range from 1 to 6;
p, q and r are each independently zero or an integer from the range from 1 to 6, preferably zero or an integer from the range from 1 to 4, more preferably zero or an integer from the range from 1 to 3; and
$X^1$, $X^2$ and $X^3$ are each independently a —$CH_2$—CH($CH_3$)—O— group or a —$CH_2$—CH($CH_2$—$CH_3$)—O— group. Preferably, $X^1$, $X^2$ and $X^3$ are each a —$CH_2$—CH($CH_3$)—O— group. Preferably, l, m, n and o are all 1 and p, q and r independently take values from 0 to 2.

In one embodiment of the process for producing a compact polyurethane having a density of ≥850 g/l, the residual amount of alkali metal salts in the polyol composition ii) is n<0.5 ppm, based on the total weight of the polyol composition ii).

In one embodiment of the process for producing a compact polyurethane having a density of ≥850 g/l, the reaction of (ii.1.1) and (ii.1.2) is performed exclusively in the presence of a boron-based, fluorine-containing Lewis acid catalyst (ii.1.3) and no further alkoxylation catalysts are used. In one embodiment of the process for producing a compact polyurethane having a density of ≥850 g/l, the reaction of (ii.1.1) and (ii.1.2) is performed exclusively in the presence of a boron-based, fluorine-containing Lewis acid catalyst (ii.1.3) in a single-stage synthesis step. The boron-based, fluorine-containing Lewis acid catalyst can optionally be removed after synthesis of the polyetherol, but preferably remains in the product.

According to a further embodiment of the process for producing a compact polyurethane having a density of ≥850 g/l, the polyether polyol (ii.1) has no ethylene oxide-based end groups, preferably has exclusively propylene oxide-based end groups and/or butylene oxide-based end groups. The polyether polyol (ii.1) preferably has exclusively propylene oxide-based end groups and/or butylene oxide-based end groups and comprises no ethylene oxide-based groups. Even when not using ethylene oxide or when using exclusively propylene oxide and/or butylene oxide, the use of the boron-based, fluorine-containing Lewis acid catalyst (ii.1.3) according to the invention results in the at least one polyether polyol (ii.1) having ≥50% primary hydroxyl groups, that is to say that at most 50% of the hydroxyl groups in the polyether polyol (ii.1) are secondary hydroxyl groups, based in each case on the entirety of all hydroxyl groups in the polyether polyol (ii.1).

According to a further embodiment of the process for producing a compact polyurethane having a density of ≥850 g/l, the polyether polyol (ii.1) is produced only by the reaction of a polyol starter, in particular triol, (ii.1.1) and propylene oxide and/or butylene oxide (ii.1.2), preferably only by the reaction of triol (ii.1.1) and propylene oxide, and no further alkylene oxide is used.

In one embodiment of the process for producing a compact polyurethane having a density of ≥850 g/l, the polyol composition ii) comprises one or more further polyols, wherein the further polyol(s) is/are exclusively polyols which have been prepared without alkali metal-catalyzed or amine-catalyzed alkoxylation. The further polyol(s) is/are preferably selected from the group consisting of hydroxyl-functionalized hydrophobic compounds, oleochemical polyols, polyetherols (polyether polyols) which have been alkoxylated in the presence of boron-containing Lewis acids, optionally polyesterols (polyester polyols) and optionally chain extenders. Details concerning this have already been elucidated at the outset with respect to the compact polyurethane; these also apply to the production process described here.

In one embodiment of the process for producing a compact polyurethane having a density of ≥850 g/l, all polyols of the polyol composition (ii) are prepared without basic or aminic catalyst. In one embodiment of the process for producing a compact polyurethane having a density of ≥850 g/l, the polyol component ii) does not comprise any aminic or basic catalysts which catalyze the polyurethane reaction.

The invention also relates to a compact polyurethane having a density of ≥850 g/l, obtained or obtainable by the process described above.

Use of a Compact Polyurethane Having a Density of ≥850 g/l for the Production of a Fiber Composite The invention also relates to the use of a compact polyurethane having a density of ≥850 g/l, obtained or obtainable by reacting at least the components:
  i) polyisocyanate composition;
  ii) polyol composition, comprising at least one polyether polyol (ii.1) which is obtained or obtainable by reacting
    ii.1.1) a polyol starter with a functionality of 3 to 6, preferably 3 or 4, with
    ii.1.2) propylene oxide and/or butylene oxide,
    in the presence of a boron-based, fluorine-containing Lewis acid catalyst (ii.1.3),
    wherein the polyether polyol (ii.1) has an equivalent molecular weight of 50 to 150 g/mol,
    ii.1.4) optionally further auxiliaries and/or additives;
for the production of a fiber composite, preferably for the impregnation of fibers.

With respect to the use of the compact polyurethane having a density of ≥850 g/l, the description already given in the section concerning the compact polyurethane applies to the polyisocyanate composition (i).

In one embodiment of the use of a compact polyurethane having a density of ≥850 g/l for the production of a fiber composite, the compact polyurethane has a density in the range from 850 to 1250 g/l, preferably a density in the range from 850 to 1100 g/l.

In one embodiment of the use of a compact polyurethane having a density of ≥850 g/l for the production of a fiber composite, the boron-based, fluorine-containing Lewis acid catalyst of (ii.1.3) has the formula $BR^1R^2R^3$, wherein $R^1$, $R^2$ and $R^3$ are each independently selected from the group consisting of fluorine atom, perfluorinated C1 to C10 alkyl radical and perfluorinated C6 to C12 aryl radical, wherein $R^1$, $R^2$ and $R^3$ are preferably identical, wherein the boron-based, fluorine-containing Lewis acid catalyst of (ii.1.3) is more preferably selected from boron trifluoride ($BF_3$), tris(pentafluorophenyl)borane $(C_6F_5)_3B$ and mixtures of $BF_3$ and $(C_6F_5)_3B$, more preferably is tris(pentafluorophenyl)borane. The use of the boron-based, fluorine-containing Lewis acid catalyst of (ii.1.3) in the reaction of polyol starter with a functionality of 3 to 6 (ii.1.1) and propylene oxide and/or butylene oxide (ii.1.2) has the result that ≥50% of the hydroxyl groups present in the polyether polyol (ii.1) are primary hydroxyl groups, that is to say that at most 50 of the hydroxyl groups formed are secondary hydroxyl groups, based in each case on the entirety of all hydroxyl groups in the polyether polyol (ii.1).

In one embodiment of the use of a compact polyurethane having a density of ≥850 g/l for the production of a fiber composite, the polyether polyol (ii.1) has a hydroxyl number of more than 400 mg KOH/g, preferably of more than 450 mg KOH/g, more preferably a hydroxyl number in the range from 400 to 1200 mg KOH/g, more preferably in the range from 450 to 1200 mg KOH/g, more preferably in the range from 450 to 1000 mg KOH/g. In one embodiment of the use of a compact polyurethane having a density of ≥850 g/l for the production of a fiber composite, the polyether polyol (ii.1) has an equivalent molecular weight in the range from 50 to 140 g/mol, preferably in the range from 55 to 135 g/mol, more preferably in the range from 60 to 130 g/mol.

In one embodiment of the use of a compact polyurethane having a density of ≥850 g/l for the production of a fiber composite, the polyether polyol (ii.1) is used in 10% to 50% by weight, based on a total weight of polyisocyanate composition (i) and polyol composition (ii) of 100% by weight.

In one embodiment of the use of a compact polyurethane having a density of ≥850 g/l for the production of a fiber composite, the polyol starter (ii.1.1) of the polyether polyol of (ii.1) is a triol with a functionality of 3, preferably a triol with a functionality of 3 with the exception of glycerol, more preferably is a triol of the formula (I)

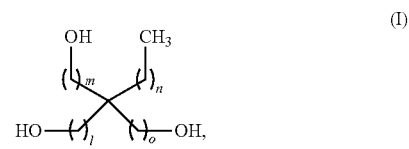

where l, m, n and o are each independently an integer from the range from 1 to 6.

In one embodiment of the use of a compact polyurethane having a density of ≥850 g/l for the production of a fiber composite, l, m, n and o of the at least one triol (ii.1.1) of the formula (I) are each independently an integer from the range from 1 to 3, preferably l, m, n and o are all 1.

In one embodiment of the use of a compact polyurethane having a density of ≥850 g/l for the production of a fiber composite, the triol (ii.1.1) has a hydroxyl number in the range from 200 to 2000 mg KOH/g, preferably in the range from 300 to 1850 mg KOH/g, more preferably in the range from 400 to 1850 mg KOH/g.

In one embodiment of the use of a compact polyurethane having a density of ≥850 g/l for the production of a fiber composite, the polyether polyol (ii.1) is based on a triol with the exception of glycerol, preferably on a triol (ii.1.1) of the formula (I) as described above, and more preferably has the formula (II)

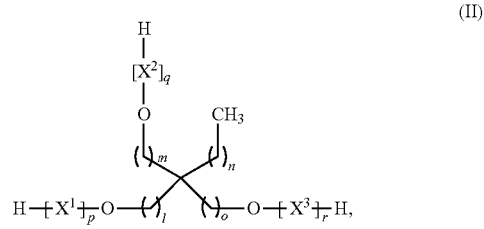

where
l, m, n and o are each independently an integer from the range from 1 to 6; p, q and r are each independently zero or an integer from the range from 1 to 6, preferably zero or an integer from the range from 1 to 4, more preferably zero or an integer from the range from 1 to 3;
and $X^1$, $X^2$ and $X^3$ are each independently a —$CH_2$—CH($CH_3$)—O— group or a —$CH_2$—CH($CH_2$—$CH_3$)—O— group, preferably $X^1$, $X^2$ and $X^3$ are each a —$CH_2$—CH ($CH_3$)—O— group. Preferably, l, m, n and o are all 1 and p, q and r independently take values from 0 to 2.

In one embodiment of the use of a compact polyurethane having a density of ≥850 g/l for the production of a fiber composite, the reaction of (ii.1.1) and (ii.1.2) is performed exclusively in the presence of a boron-based, fluorine-containing Lewis acid catalyst (ii.1.3) and no further alkoxylation catalysts are used. In one embodiment of the use of a compact polyurethane having a density of ≥850 g/l, the reaction of (ii.1.1) and (ii.1.2) is performed exclusively in the presence of a boron-based, fluorine-containing Lewis acid catalyst (ii.1.3) in a single-stage synthesis step. The boron-based, fluorine-containing Lewis acid catalyst can optionally be removed after synthesis of the polyetherol, but preferably remains in the product.

In one embodiment of the use of a compact polyurethane having a density of ≥850 g/l for the production of a fiber composite, the polyether polyol (ii.1) has no ethylene oxide-based end groups, preferably has exclusively propylene oxide-based end groups and/or butylene oxide-based end groups. The polyether polyol (ii.1) preferably comprises exclusively propylene oxide-based end groups and/or butylene oxide-based end groups has and no ethylene oxide-based groups. More preferably, the polyether polyol (ii.1) is produced only by the reaction of polyol starter, in particular triol, (ii.1.1) and propylene oxide and/or butylene oxide (ii.1.2) and no further alkylene oxide is used. Even when not using ethylene oxide or when using exclusively propylene oxide and/or butylene oxide, the use of the boron-based, fluorine-containing Lewis acid catalyst (ii.1.3) according to the invention results in the at least one polyether polyol (ii.1) having w 50% primary hydroxyl groups, that is to say that at most 50% of the hydroxyl groups in the polyether polyol (ii.1) are secondary hydroxyl groups, based in each case on the entirety of all hydroxyl groups in the polyether polyol (ii.1). In one embodiment of the use of a compact polyurethane having a density of ≥850 g/l for the production of a fiber composite, the polyol composition ii) comprises one or more further polyols, wherein the further polyol(s) is/are exclusively polyols which have been prepared without alkali metal-catalyzed or amine-catalyzed alkoxylation.

In one embodiment of the use of a compact polyurethane having a density of ≥850 g/l for the production of a fiber composite, the further polyol(s) is/are selected from the group consisting of hydroxyl-functionalized hydrophobic compounds, oleochemical polyols, polyether polyols which have been alkoxylated in the presence of boron-containing Lewis acids, optionally polyester polyols and optionally chain extenders. Details concerning the employed hydroxyl-functionalized hydrophobic compounds, oleochemical polyols, polyether polyols which have been alkoxylated in the presence of boron-containing Lewis acids, optional polyester polyols and optional chain extenders have already been elucidated at the outset with respect to the compact polyurethane; these details likewise apply to the use described here. All polyols of the polyol composition (ii) are prepared without basic or aminic catalyst; the polyol composition (ii) does not comprise any aminic or basic catalysts.

In one embodiment of the use, the polyol composition ii) comprises one or more further polyols as hydroxyl-functionalized hydrophobic compound(s), wherein all polyols have been prepared exclusively without alkali metal-catalyzed or amine-catalyzed alkoxylation. Traces of KOH/CsOH/amines can function as catalysts for the production of PU and also for the reaction of water and isocyanate. Therefore, the invention employs those polyols and raw materials not comprising these components. The use of polyols prepared with KOH catalysis, which have then been purified so that the salt is largely removed, also leads to foaming material when reacting with isocyanates at high atmospheric humidity.

In one embodiment of the use, the residual amount of alkali metal salts in the polyol composition ii) is n<0.5 ppm, based on the total weight of the polyol composition ii).

The composition of the polyol component is preferably adjusted here so that it has a viscosity at 25° C. of preferably less than 1000 mPas.

Fiber Composite Material

The invention also relates to a fiber composite material comprising the following components:
a) a compact polyurethane having a density of ≥850 g/l, obtained or obtainable by reacting at least the components:
i) polyisocyanate composition;
ii) polyol composition, comprising at least one polyether polyol (ii.1)
which is obtained or obtainable by reacting
ii.1.1) a polyol starter with a functionality of 3 to 6, preferably 3 or 4,
with
ii.1.2) propylene oxide and/or butylene oxide,
in the presence of a boron-based, fluorine-containing Lewis acid catalyst (ii.1.3),
wherein the polyether polyol (ii.1) has an equivalent molecular weight of 50 to 150 g/mol,
ii.1.4) optionally further auxiliaries and/or additives;
b) fibers which are at least partially embedded in the compact polyurethane.

In one embodiment of the fiber composite, the compact polyurethane is obtained or obtainable by reacting components (i), (ii) and, as additive ii.1.4), at least one deaerator.

With respect to the fiber composite, the description already given in the section concerning the compact polyurethane applies to the polyisocyanate composition (i).

In one embodiment of the fiber composite, the compact polyurethane has a density in the range from 850 to 1250 g/l, preferably a density in the range from 850 to 1100 g/l.

In one embodiment of the fiber composite, the boron-based, fluorine-containing Lewis acid catalyst of (ii.1.3) has the formula $BR^1R^2R^3$, wherein $R^1$, $R^2$ and $R^3$ are each independently selected from the group consisting of fluorine atom, perfluorinated C1 to C10 alkyl radical and perfluorinated C6 to C12 aryl radical, wherein $R^1$, $R^2$ and $R^3$ are preferably identical, wherein the boron-based, fluorine-containing Lewis acid catalyst of (ii.1.3) is more preferably selected from boron trifluoride ($BF_3$), tris(pentafluorophenyl)borane ($C_6F_5$)$_3$B and mixtures of $BF_3$ and ($C_6F_5$)$_3$B, more preferably is tris(pentafluorophenyl)borane. The use of the boron-based, fluorine-containing Lewis acid catalyst of (ii.1.3) in the reaction of polyol starter with a functionality of 3 to 6 (ii.1.1) and propylene oxide and/or butylene oxide (ii.1.2) has the result that ≥50% of the hydroxyl groups present in the polyether polyol (ii.1) are primary hydroxyl groups, that is to say that at most 50% of the hydroxyl groups formed are secondary hydroxyl groups, based in each case on the entirety of all hydroxyl groups in the polyether polyol (ii.1).

In one embodiment of the fiber composite, the polyether polyol (ii.1) has a hydroxyl number of more than 400 mg KOH/g, preferably of more than 450 mg KOH/g, more preferably a hydroxyl number in the range from 400 to 1200 mg KOH/g, more preferably in the range from 450 to 1200 mg KOH/g, more preferably in the range from 450 to 1000 mg KOH/g. In one embodiment of the fiber composite, the polyether polyol (ii.1) has an equivalent molecular weight in the range from 50 to 140 g/mol, preferably in the range from 55 to 135 g/mol, more preferably in the range from 60 to 130 g/mol.

In one embodiment of the fiber composite, the polyether polyol (ii.1) is used in 10% to 50% by weight, based on a total weight of polyisocyanate composition (i) and polyol composition (ii) of 100% by weight.

In one embodiment of the fiber composite, the polyol starter (ii.1.1) of the polyether polyol of (ii.1) is a triol with a functionality of 3, preferably a triol with a functionality of 3 with the exception of glycerol, more preferably a triol of the formula (I)

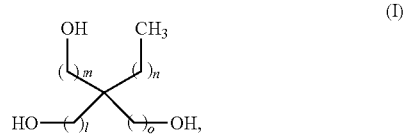

where l, m, n and o are each independently an integer from the range from 1 to 6.

In one embodiment of the fiber composite, l, m, n and o of the at least one triol (ii.1.1) of the formula (I) are each independently an integer from the range from 1 to 3, preferably l, m, n and o are all 1.

In one embodiment of the fiber composite, the polyether polyol (ii.1) has a hydroxyl number in the range from 200 to 2000 mg KOH/g, preferably in the range from 300 to 1500 mg KOH/g, more preferably in the range from 400 to 1300 mg KOH/g.

In one embodiment of the fiber composite, the polyether polyol (ii.1) is based on a triol with the exception of glycerol, preferably on a triol (ii.1.1) of the formula (I) as shown above, and more preferably has the formula (II)

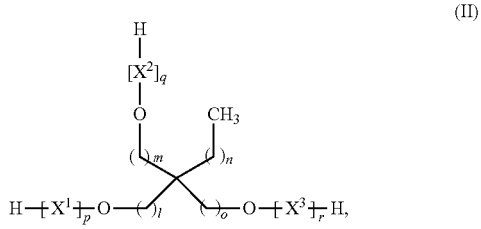

where
l, m, n and o are each independently an integer from the range from 1 to 6; p, q and r are each independently zero or an integer from the range from 1 to 6, preferably zero or an integer from the range from 1 to 4, more preferably zero or an integer from the range from 1 to 3;
and $X^1$, $X^2$ and $X^3$ are each independently a —$CH_2$—CH($CH_3$)—O— group or a —$CH_2$—CH($CH_2$—$CH_3$)—O— group, preferably $X^1$, $X^2$ and $X^3$ are each a —$CH_2$—CH($CH_3$)—O— group. Preferably, l, m, n and o are all 1 and p, q and r independently take values from 0 to 2.

In one embodiment of the fiber composite, the reaction of (ii.1.1) and (ii.1.2) is performed exclusively in the presence of a boron-based, fluorine-containing Lewis acid catalyst (ii.1.3) and no further alkoxylation catalysts are used. In one embodiment of the fiber composite, the reaction of (ii.1.1) and (ii.1.2) is performed exclusively in the presence of a boron-based, fluorine-containing Lewis acid catalyst (ii.1.3) in a single-stage synthesis step. The boron-based, fluorine-containing Lewis acid catalyst can optionally be removed after synthesis of the polyetherol, but preferably remains in the product.

In one embodiment of the fiber composite, the polyether polyol (ii.1) has no ethylene oxide-based end groups, preferably has exclusively propylene oxide-based end groups and/or butylene oxide-based end groups. The polyether polyol (ii.1) more preferably has exclusively propylene oxide-based end groups and/or butylene oxide-based end groups and comprises no ethylene oxide-based groups. Even when not using ethylene oxide or when using exclusively propylene oxide and/or butylene oxide, the use of the boron-based, fluorine-containing Lewis acid catalyst (ii.1.3) according to the invention results in the at least one polyether polyol (ii.1) having ≥50% primary hydroxyl groups, that is to say that at most 50% of the hydroxyl groups in the polyether polyol (ii.1) are secondary hydroxyl groups, based in each case on the entirety of all hydroxyl groups in the polyether polyol (ii.1).

In a preferred embodiment of the fiber composite, the polyether polyol (ii.1) is produced only by the reaction of polyol, in particular triol, (ii.1.1) and propylene oxide and/or butylene oxide (ii.1.2), preferably only by the reaction of triol (ii.1.1) and propylene oxide, and no further alkylene oxide is used.

Preferred fibers in one embodiment of the fiber composite are glass fibers, carbon fibers, polyester fibers, natural fibers, such as cellulose fibers, aramid fibers, nylon fibers, basalt fibers, boron fibers, Zylon fibers (poly(p-phenylene-2,6-benzobisoxazole)), silicon carbide fibers, asbestos fibers, metal fibers and combinations thereof. These can by way of example take the form of short or long glass fibers, continuous fibers, laid scrims, knitted fabrics, random-laid fiber mats, and plies with identical or different fiber orientation. Techniques for the wetting of the fibers are subject to no restriction and are well known. These encompass by way of example the filament winding process, the pultrusion process, the manual lamination process, the RTM process and the infusion process, for example the vacuum infusion process.

In one embodiment of the fiber composite, the polyol composition ii) comprises one or more further polyols, wherein the further polyol(s) is/are exclusively polyols which have been prepared without alkali metal-catalyzed or amine-catalyzed alkoxylation. The residual amount of alkali metal salts in the polyol composition ii) is n<0.5 ppm, based on the total weight of the polyol composition ii).

In one embodiment of the fiber composite, the further polyol(s) is/are selected from the group consisting of hydroxyl-functionalized hydrophobic compounds, oleochemical polyols, polyetherols (polyether polyols) which have been alkoxylated in the presence of boron-containing Lewis acids, optionally polyesterols (polyester polyols) and optionally chain extenders. Details concerning the employed hydroxyl-functionalized hydrophobic compounds, oleochemical polyols, polyether polyols which have been alkoxylated in the presence of boron-containing Lewis acids, optional polyester polyols and optional chain extenders have already been elucidated at the outset with respect to the compact polyurethane; these details likewise apply to the fiber composite described here. The polyols of the polyol composition (ii) are prepared without basic or aminic catalyst; the polyol composition (ii) does not comprise any aminic or basic catalysts.

Preferred fibers are glass fibers, carbon fibers, polyester fibers, natural fibers, for example cellulose fibers, aramid fibers, nylon fibers, basalt fibers, boron fibers, Zylon fibers (poly(p-phenylene-2,6-benzobisoxazole)), silicon carbide fibers, asbestos fibers, metal fibers and combinations thereof. These can by way of example take the form of short or long glass fibers, continuous fibers, laid scrims, knitted fabrics, random-laid fiber mats, and plies with identical or different fiber orientation. Techniques for the wetting of the fibers are subject to no restriction and are well known. These encompass by way of example the filament winding process, the pultrusion process, the manual lamination process, the resin transfer molding (RTM) process and the infusion process, for example the vacuum infusion process.

Process for Producing a Fiber Composite

The invention also relates to a process for producing a fiber composite, comprising:
1) providing fibers;
2) providing at least the components:
   i) polyisocyanate composition;
   ii) polyol composition, comprising at least one polyether polyol (ii.1) which is obtained or obtainable by reacting
      ii.1.1) a polyol starter with a functionality of 3 to 6, preferably 3 or 4,
      with
      ii.1.2) propylene oxide and/or butylene oxide,
      in the presence of a boron-based, fluorine-containing Lewis acid catalyst (ii.1.3),
         wherein the polyether polyol (ii.1) has an equivalent molecular weight of 50 to 150 g/mol,
      ii.1.4) optionally further auxiliaries and/or additives;
3) mixing components i) and ii) of 2) to obtain a reactive mixture;
4) impregnating the fibers with the reactive mixture obtained as per 3);
5) curing the reactive mixture to obtain a fiber composite, wherein the polyurethane is compact and has a density of ≥850 g/l.

With respect to the process for producing a fiber composite, the description already given in the section concerning the compact polyurethane applies to the polyisocyanate composition (i).

In one embodiment of the process for producing a fiber composite, the compact polyurethane has a density in the range from 850 to 1250 g/l, preferably a density in the range from 850 to 1100 g/l.

In one embodiment of the process for producing a fiber composite, the boron-based, fluorine-containing Lewis acid catalyst of (ii.1.3) has the formula $BR^1R^2R^3$, wherein $R^1$, $R^2$ and $R^3$ are each independently selected from the group consisting of fluorine atom, perfluorinated C1 to C10 alkyl radical and perfluorinated C6 to C12 aryl radical, wherein $R^1$, $R^2$ and $R^3$ are preferably identical, wherein the boron-based, fluorine-containing Lewis acid catalyst of (ii.1.3) is more preferably selected from boron trifluoride ($BF_3$), tris(pentafluorophenyl)borane $(C_6F_5)_3B$ and mixtures of $BF_3$ and $(C_6F_5)_3B$, more preferably is tris(pentafluorophenyl)borane. The use of the boron-based, fluorine-containing Lewis acid catalyst of (ii.1.3) in the reaction of polyol starter with a functionality of 3 to 6 (ii.1.1) and propylene oxide and/or butylene oxide (ii.1.2) has the result that 50% of the hydroxyl groups present in the polyether polyol (ii.1) are primary hydroxyl groups, that is to say that at most 50% of the hydroxyl groups formed are secondary hydroxyl groups, based in each case on the entirety of all hydroxyl groups in the polyether polyol (ii.1).

In one embodiment of the process for producing a fiber composite, the polyether polyol (ii.1) has a hydroxyl number of more than 400 mg KOH/g, preferably of more than 450 mg KOH/g, more preferably a hydroxyl number in the range from 400 to 1200 mg KOH/g, more preferably in the range from 450 to 1200 mg KOH/g, more preferably in the range from 450 to 1000 mg KOH/g.

In one embodiment of the process for producing a fiber composite, the polyether polyol (ii.1) has an equivalent molecular weight in the range from 50 to 140 g/mol, preferably in the range from 55 to 135 g/mol, more preferably in the range from 60 to 130 g/mol.

In one embodiment of the process for producing a fiber composite, the polyether polyol (ii.1) is used in 10% to 50% by weight, based on a total weight of polyisocyanate composition (i) and polyol composition (ii) of 100% by weight.

In one embodiment of the process for producing a fiber composite, the polyol starter (ii.1.1) of the polyether polyol of (ii.1) is a triol with a functionality of 3, preferably a triol with a functionality of 3 with the exception of glycerol, more preferably a triol of the formula (I)

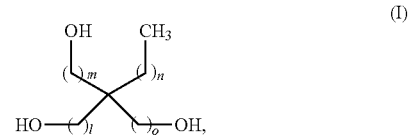

where l, m, n and o are each independently an integer from the range from 1 to 6.

In one embodiment of the process for producing a fiber composite, l, m, n and o of the at least one triol (ii.1.1) of the formula (I) are each independently an integer from the range from 1 to 3, preferably l, m, n and o are all 1.

In one embodiment of the process for producing a fiber composite, the triol (ii.1.1) has a hydroxyl number in the range from 200 to 2000 mg KOH/g, preferably in the range from 300 to 1850 mg KOH/g, more preferably in the range from 400 to 1850 mg KOH/g.

In one embodiment of the process for producing a fiber composite, the polyether polyol (ii.1) is based on a triol with the exception of glycerol, preferably on a triol (ii.1.1) of the formula (I) as shown above, and more preferably has the formula (II)

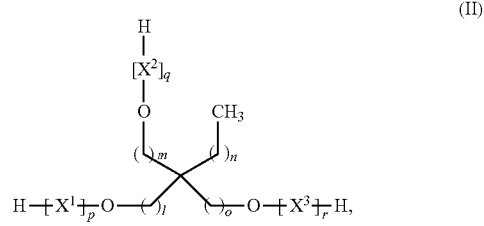

where
l, m, n and o are each independently an integer from the range from 1 to 6; p, q and r are each independently zero or an integer from the range from 1 to 6, preferably zero or an integer from the range from 1 to 4, more preferably zero or an integer from the range from 1 to 3;
and $X^1$, $X^2$ and $X^3$ are each independently a —$CH_2$—CH($CH_3$)—O— group or a —$CH_2$—CH($CH_2$—$CH_3$)—O— group, preferably $X^1$, $X^2$ and $X^3$ are each a —$CH_2$—CH($CH_3$)—O— group. Preferably, l, m, n and o are all 1 and p, q and r independently take values from 0 to 2.

In one embodiment of the process for producing a fiber composite, the reaction of (ii.1.1) and (ii.1.2) is performed exclusively in the presence of a boron-based, fluorine-containing Lewis acid catalyst (ii.1.3) and no further alkoxylation catalysts are used. In one embodiment of the process for producing a fiber composite, the reaction of (ii.1.1) and (ii.1.2) is performed exclusively in the presence of a boron-based, fluorine-containing Lewis acid catalyst (ii.1.3) in a single-stage synthesis step. The boron-based, fluorine-containing Lewis acid catalyst can optionally be removed after synthesis of the polyetherol, but preferably remains in the product.

In one embodiment of the process for producing a fiber composite, the polyether polyol (ii.1) has no ethylene oxide-based end groups, preferably has exclusively propylene oxide-based end groups and/or butylene oxide-based end groups.

In one embodiment of the process for producing a fiber composite, the polyether polyol (ii.1) has exclusively propylene oxide-based end groups and/or butylene oxide-based end groups and comprises no ethylene oxide-based groups. Even when not using ethylene oxide or when using exclusively propylene oxide and/or butylene oxide, the use of the boron-based, fluorine-containing Lewis acid catalyst (ii.1.3) according to the invention results in the at least one polyether polyol (ii.1) having ≥50% primary hydroxyl groups, that is to say that at most 50% of the hydroxyl groups in the polyether polyol (ii.1) are secondary hydroxyl groups, based in each case on the entirety of all hydroxyl groups in the polyether polyol (ii.1).

In one embodiment of the process for producing a fiber composite, the polyether polyol (ii.1) is produced only by the reaction of polyol starter, in particular triol, (ii.1.1) and propylene oxide and/or butylene oxide (ii.1.2), preferably only by the reaction of triol (ii.1.1) and propylene oxide, and no further alkylene oxide is used.

In one embodiment of the process for producing a fiber composite, the polyol composition ii) comprises one or more further polyols, wherein the further polyol(s) is/are exclusively polyols which have been prepared without alkali metal-catalyzed or amine-catalyzed alkoxylation.

In one embodiment of the process for producing a fiber composite, the residual amount of alkali metal salts in the polyol composition ii) is n<0.5 ppm, based on the total weight of the polyol composition ii).

In one embodiment of the process for producing a fiber composite, the further polyol(s) is/are selected from the group consisting of hydroxyl-functionalized hydrophobic compounds, oleochemical polyols, polyetherols (polyether polyols) which have been alkoxylated in the presence of boron-containing Lewis acids, optionally polyesterols (polyester polyols) and optionally chain extenders. Details concerning the employed hydroxyl-functionalized hydrophobic compounds, oleochemical polyols, polyether polyols which have been alkoxylated in the presence of boron-containing Lewis acids, optional polyester polyols and optional chain extenders have already been elucidated at the outset with respect to the compact polyurethane; these details likewise apply to the process for producing a fiber composite described here. All polyols of the polyol composition (ii) are prepared without basic or aminic catalyst; the polyol composition (ii) does not comprise any aminic or basic catalysts. The composition of the polyol component is preferably adjusted so that it has a viscosity at 25° C. of preferably less than 1000 mPas (measured in accordance with DIN 53019-1 to 3). The viscosity of the polyol component (ii) at 23° C. is preferably less than 500 mPas (measured in accordance with DIN 53019-1 to 3).

Preferred fibers are glass fibers, carbon fibers, polyester fibers, natural fibers, for example cellulose fibers, aramid fibers, nylon fibers, basalt fibers, boron fibers, Zylon fibers (poly(p-phenylene-2,6-benzobisoxazole)), silicon carbide fibers, asbestos fibers, metal fibers and combinations thereof. These can by way of example take the form of short or long glass fibers, continuous fibers, laid scrims, knitted fabrics, random-laid fiber mats, and plies with identical or different fiber orientation. Techniques for the wetting of the fibers are subject to no restriction and are well known. These encompass by way of example the filament winding process, the pultrusion process, the manual lamination process, the RTM process and the infusion process, for example the vacuum infusion process.

The present invention is illustrated in more detail by the following embodiments and combinations of embodiments which result from the corresponding dependency references and other references. In particular, it should be noted that in every case where a range of embodiments is mentioned, for example in the context of an expression such as "the process according to any of embodiments 1 to 4", each embodiment in this range is deemed to be explicitly disclosed to those skilled in the art, i.e. the wording of this expression is to be understood by those skilled in the art as synonymous with "the process according to any of embodiments 1, 2, 3, and 4".

1. A compact polyurethane having a density of ≥850 g/l, obtained or obtainable by reacting at least the components:
   i) polyisocyanate composition;
   ii) polyol composition, comprising at least one polyether polyol (ii.1) which is obtained or obtainable by reacting
      ii.1.1) a polyol starter with a functionality of 3 to 6, preferably 3 or 4, with
      ii.1.2) propylene oxide and/or butylene oxide,
      in the presence of a boron-based, fluorine-containing Lewis acid catalyst (ii.1.3), wherein the polyether polyol (ii.1) has an equivalent molecular weight of 50 to 150 g/mol;
      ii.1.4) optionally further auxiliaries and/or additives.
2. The compact polyurethane according to embodiment 1, having a density in the range from 850 to 1250 g/l, preferably a density in the range from 850 to 1100 g/l.
3. The compact polyurethane according to embodiment 1 or 2, wherein the boron-based, fluorine-containing Lewis acid catalyst of (ii.1.3) has the formula $BR^1R^2R^3$, wherein $R^1$, $R^2$ and $R^3$ are each independently selected from the group consisting of fluorine atom, perfluorinated C1 to C10 alkyl radical and perfluorinated C6 to C12 aryl radical, wherein $R^1$, $R^2$ and $R^3$ are preferably identical, wherein the boron-based, fluorine-containing Lewis acid catalyst of (ii.1.3) is more preferably selected from boron trifluoride ($BF_3$), tris(pentafluorophenyl)borane $(C_6F_5)_3B$ and mixtures of $BF_3$ and $(C_6F_5)_3B$, more preferably is tris(pentafluorophenyl)borane.
4. The compact polyurethane according to any of embodiments 1 to 3, wherein the polyether polyol (ii.1) has a hydroxyl number of more than 400 mg KOH/g, preferably of more than 450 mg KOH/g, more preferably a hydroxyl number in the range from 400 to 1200 mg KOH/g, more preferably in the range from 450 to 1200 mg KOH/g, more preferably in the range from 450 to 1000 mg KOH/g.

5. The compact polyurethane according to any of embodiments 1 to 4, wherein the polyether polyol (ii.1) has an equivalent molecular weight in the range from 50 to 140 g/mol, preferably in the range from 55 to 135 g/mol, more preferably in the range from 60 to 130 g/mol.

6. The compact polyurethane according to any of embodiments 1 to 5, wherein the polyether polyol (ii.1) is used in 10% to 50% by weight, based on a total weight of polyisocyanate composition (i) and polyol composition (ii) of 100% by weight.

7. The compact polyurethane according to any of embodiments 1 to 6, wherein the polyol starter (ii.1.1) of the polyether polyol (ii.1) is a triol with a functionality of 3, preferably a triol with a functionality of 3 with the exception of glycerol, more preferably a triol of the formula (I)

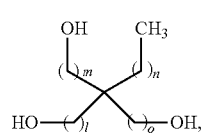
(I)

where l, m, n and o are each independently an integer from the range from 1 to 6.

8. The compact polyurethane according to embodiment 7, where l, m, n and o of the at least one triol (ii.1.1) of the formula (I) are each independently an integer from the range from 1 to 3, preferably l, m, n and o are all 1.

9. The compact polyurethane according to embodiment 7 or 8, wherein the triol (ii.1.1) has a hydroxyl number in the range from 200 to 2000 mg KOH/g, preferably in the range from 300 to 1850 mg KOH/g, more preferably in the range from 400 to 1850 mg KOH/g.

10. The compact polyurethane according to any of embodiments 1 to 9, wherein the polyether polyol (ii.1) is based on a triol with the exception of glycerol, preferably on a triol (ii.1.1) of the formula (I) as per embodiment 7 or 8, and more preferably has the formula (II)

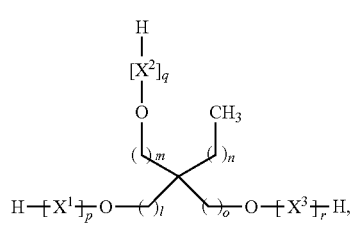
(II)

where
l, m, n and o are each independently an integer from the range from 1 to 6; p, q and r are each independently zero or an integer from the range from 1 to 6; and $X^1$, $X^2$ and $X^3$ are each independently a —$CH_2$—$CH(CH_3)$—O— group or a —$CH_2$—$CH(CH_2$—$CH_3)$—O— group, preferably $X^1$, $X^2$ and $X^3$ are each a —$CH_2$—$CH(CH_3)$—O— group.

11. The compact polyurethane according to any of embodiments 1 to 10, wherein the reaction of (ii.1.1) and (ii.1.2) is performed exclusively in the presence of a boron-based, fluorine-containing Lewis acid catalyst (ii.1.3) and no further alkoxylation catalysts are used.

12. The compact polyurethane according to any of embodiments 1 to 11, wherein the polyether polyol (ii.1) has no ethylene oxide-based end groups, preferably has exclusively propylene oxide-based end groups and/or butylene oxide-based end groups.

13. The compact polyurethane according to any of embodiments 1 to 12, wherein the polyether polyol (ii.1) has exclusively propylene oxide-based end groups and/or butylene oxide-based end groups and comprises no ethylene oxide-based groups.

14. The compact polyurethane according to any of embodiments 1 to 13, wherein the polyether polyol (ii.1) is produced only by the reaction of a polyol starter, in particular triol, (ii.1.1) and propylene oxide and/or butylene oxide (ii.1.2), preferably only by the reaction of triol (ii.1.1) and propylene oxide, and no further alkylene oxide is used.

15. The compact polyurethane according to any of embodiments 1 to 14, wherein the polyol composition ii) comprises one or more further polyols, wherein the further polyol(s) is/are exclusively polyols which have been prepared without alkali metal-catalyzed or amine-catalyzed alkoxylation.

16. The compact polyurethane according to embodiment 15, wherein the residual amount of alkali metal salts in the polyol composition ii) is n<0.5 ppm, based on the total weight of the polyol composition ii).

17. The compact polyurethane according to embodiment 15 or 16, wherein the further polyol(s) is/are selected from the group consisting of hydroxyl-functionalized hydrophobic compounds, oleochemical polyols, polyether polyols which have been alkoxylated in the presence of boron-containing Lewis acids, optionally polyester polyols and optionally chain extenders.

18. The compact polyurethane according to any of embodiments 15 to 17, wherein all polyols of polyol composition (ii) have been prepared without basic or aminic catalyst.

19. The compact polyurethane according to any of embodiments 15 to 18, wherein the polyol composition (ii) does not comprise any aminic or basic catalysts.

20. A process for producing a compact polyurethane having a density of ≥850 g/l, comprising the reaction of at least the components:
i) polyisocyanate composition;
ii) polyol composition, comprising at least one polyether polyol (ii.1) which is obtained or obtainable by reacting
ii.1.1) a polyol starter with a functionality of 3 to 6, preferably 3 or 4,
with
ii.1.2) propylene oxide and/or butylene oxide,
in the presence of a boron-based, fluorine-containing Lewis acid catalyst (ii.1.3), wherein the polyether polyol (ii.1) has an equivalent molecular weight of 50 to 150 g/mol,
ii.1.4) optionally further auxiliaries and/or additives.

21. The process for producing a compact polyurethane having a density of ≥850 g/l according to embodiment 20, wherein the compact polyurethane has a density in the range from 850 to 1250 g/l, preferably a density in the range from 850 to 1100 g/l.

22. The process for producing a compact polyurethane having a density of ≥850 g/l according to embodiment 20 or 21, wherein the boron-based, fluorine-containing Lewis acid catalyst of (ii.1.3) has the formula $BR^1R^2R^3$, wherein $R^1$, $R^2$ and $R^3$ are each independently selected from the group consisting of fluorine atom, perfluorinated C1 to C10 alkyl radical and perfluorinated C6 to C12 aryl radical, wherein $R^1$, $R^2$ and $R^3$ are preferably identical, wherein the boron-based, fluorine-containing Lewis acid catalyst of (ii.1.3) is more preferably selected from boron trifluoride ($BF_3$), tris(pentafluorophenyl)borane ($(C_6F_5)_3B$) and mixtures of $BF_3$ and $(C_6F_5)_3B$, more preferably is tris(pentafluorophenyl)borane.

23. The process for producing a compact polyurethane having a density of ≥850 g/l according to any of embodiments 20 to 21, wherein the polyether polyol (ii.1) has a hydroxyl number of more than 400 mg KOH/g, preferably of more than 450 mg KOH/g, more preferably a hydroxyl number in the range from 400 to 1200 mg KOH/g, more preferably in the range from 450 to 1200 mg KOH/g, more preferably in the range from 450 to 1000 mg KOH/g.

24. The process for producing a compact polyurethane having a density of ≥850 g/l according to any of embodiments 20 to 23, wherein the polyether polyol (ii.1) has an equivalent molecular weight in the range from 50 to 140 g/mol, preferably in the range from 55 to 135 g/mol, more preferably in the range from 60 to 130 g/mol.

25. The process for producing a compact polyurethane having a density of ≥850 g/l according to any of embodiments 20 to 24, wherein the polyether polyol (ii.1) is used in 10% to 50% by weight, based on a total weight of polyisocyanate composition (i) and polyol composition (ii) of 100% by weight.

26. The process for producing a compact polyurethane having a density of ≥850 g/l according to any of embodiments 20 to 25, wherein the polyol starter (ii.1.1) of the polyether polyol of (ii.1) is a triol with a functionality of 3, preferably a triol with a functionality of 3 with the exception of glycerol, more preferably is a triol of the formula (I)

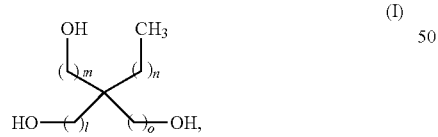

where l, m, n and o are each independently an integer from the range from 1 to 6.

27. The process for producing a compact polyurethane having a density of ≥850 g/l according to embodiment 26, where l, m, n and o of the at least one triol (ii.1.1) of the formula (I) are each independently an integer from the range from 1 to 3, preferably l, m, n and o are all 1.

28. The process for producing a compact polyurethane having a density of ≥850 g/l according to embodiment 26 or 27, wherein the triol (ii.1.1) has a hydroxyl number in the range from 200 to 2000 mg KOH/g, preferably in the range from 300 to 1850 mg KOH/g, more preferably in the range from 400 to 1850 mg KOH/g.

29. The process for producing a compact polyurethane having a density of ≥850 g/l according to any of embodiments 26 to 28, wherein the polyether polyol (ii.1) is based on a triol with the exception of glycerol, preferably on a triol (ii.1.1) of the formula (I) as per embodiment 26 or 27, and more preferably has the formula (II)

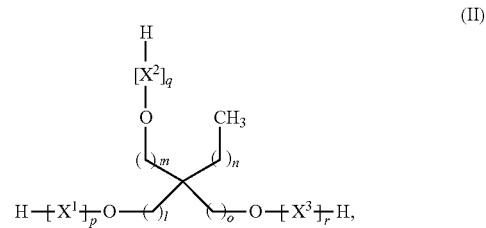

where
l, m, n and o are each independently an integer from the range from 1 to 6; p, q and r are each independently zero or an integer from the range from 1 to 6;
and $X^1$, $X^2$ and $X^3$ are each independently a —$CH_2$—$CH(CH_3)$—O— group or a —$CH_2$—$CH(CH_2$—$CH_3)$—O— group, preferably $X^1$, $X^2$ and $X^3$ are each a —$CH_2$—$CH(CH_3)$—O— group.

30. The process for producing a compact polyurethane having a density of ≥850 g/l according to any of embodiments 20 to 29, wherein the reaction of (ii.1.1) and (ii.1.2) is performed exclusively in the presence of a boron-based, fluorine-containing Lewis acid catalyst (ii.1.3) and no further alkoxylation catalysts are used.

31. The process for producing a compact polyurethane having a density of ≥850 g/l according to any of embodiments 20 to 30, wherein the polyether polyol (ii.1) has no ethylene oxide-based end groups, preferably has exclusively propylene oxide-based end groups and/or butylene oxide-based end groups.

32. The process for producing a compact polyurethane having a density of ≥850 g/l according to any of embodiments 20 to 31, wherein the polyether polyol (ii.1) has exclusively propylene oxide-based end groups and/or butylene oxide-based end groups and comprises no ethylene oxide-based groups.

33. The process for producing a compact polyurethane having a density of ≥850 g/l according to any of embodiments 20 to 32, wherein the polyether polyol (ii.1) is produced only by the reaction of a polyol starter, in particular triol, (ii.1.1) and propylene oxide and/or butylene oxide (ii.1.2), preferably only by the reaction of triol (ii.1.1) and propylene oxide, and no further alkylene oxide is used.

34. The process for producing a compact polyurethane having a density of ≥850 g/l according to any of embodiments 20 to 33, wherein the polyol composition ii) comprises one or more further polyols, wherein the further polyol(s) is/are exclusively polyols which have been prepared without alkali metal-catalyzed or amine-catalyzed alkoxylation.

35. The process for producing a compact polyurethane having a density of ≥850 g/l according to embodiment 34, wherein the residual amount of alkali metal salts in the polyol composition ii) is n<0.5 ppm, based on the total weight of the polyol composition ii).
36. The process for producing a compact polyurethane having a density of ≥850 g/l according to embodiment 34 or 35, wherein the further polyol(s) is/are selected from the group consisting of hydroxyl-functionalized hydrophobic compounds, oleochemical polyols, polyether polyols which have been alkoxylated in the presence of boron-containing Lewis acids, optionally polyester polyols and optionally chain extenders.
37. The process for producing a compact polyurethane having a density of ≥850 g/l according to any of embodiments 34 to 36, wherein all polyols of polyol composition (ii) have been prepared without basic or aminic catalyst.
38. The process for producing a compact polyurethane having a density of ≥850 g/l according to any of embodiments 34 to 37, wherein the polyol composition (ii) does not comprise any aminic or basic catalysts.
39. A compact polyurethane having a density of ≥850 g/l, obtained or obtainable by the process according to any of embodiments 20 to 38.
40. The use of a compact polyurethane having a density of ≥850 g/l, obtained or obtainable by reacting at least the components:
  i) polyisocyanate composition;
  ii) polyol composition, comprising at least one polyether polyol (ii.1) which is obtained or obtainable by reacting
    ii.1.1) a polyol starter with a functionality of 3 to 6, preferably 3 or 4,
    with
    ii.1.2) propylene oxide and/or butylene oxide,
    in the presence of a boron-based, fluorine-containing Lewis acid catalyst (ii.1.3), wherein the polyether polyol (ii.1) has an equivalent molecular weight of 50 to 150 g/mol,
    ii.1.4) optionally further auxiliaries and/or additives;
  for the production of a fiber composite, preferably for the impregnation of fibers.
41. The use of a compact polyurethane having a density of ≥850 g/l for the production of a fiber composite according to embodiment 40, wherein the compact polyurethane has a density in the range from 850 to 1250 g/l, preferably a density in the range from 850 to 1100 g/l.
42. The use of a compact polyurethane having a density of ≥850 g/l for the production of a fiber composite according to embodiment 40 or 41, wherein the boron-based, fluorine-containing Lewis acid catalyst of (ii.1.3) has the formula $BR^1R^2R^3$, wherein $R^1$, $R^2$ and $R^3$ are each independently selected from the group consisting of fluorine atom, perfluorinated C1 to C10 alkyl radical and perfluorinated C6 to C12 aryl radical, wherein $R^1$, $R^2$ and $R^3$ are preferably identical, wherein the boron-based, fluorine-containing Lewis acid catalyst of (ii.1.3) is more preferably selected from boron trifluoride ($BF_3$), tris(pentafluorophenyl)borane ($(C_6F_5)_3B$) and mixtures of $BF_3$ and $(C_6F_5)_3B$, more preferably is tris(pentafluorophenyl)borane.
43. The use of a compact polyurethane having a density of ≥850 g/l for the production of a fiber composite according to any of embodiments 40 to 42, wherein the polyether polyol (ii.1) has a hydroxyl number of more than 400 mg KOH/g, preferably of more than 450 mg KOH/g, more preferably a hydroxyl number in the range from 400 to 1200 mg KOH/g, more preferably in the range from 450 to 1200 mg KOH/g, more preferably in the range from 450 to 1000 mg KOH/g.
44. The use of a compact polyurethane having a density of ≥850 g/l for the production of a fiber composite according to any of embodiments 40 to 43, wherein the polyether polyol (ii.1) has an equivalent molecular weight in the range from 50 to 140 g/mol, preferably in the range from 55 to 135 g/mol, more preferably in the range from 60 to 130 g/mol.
45. The use of a compact polyurethane having a density of ≥850 g/l for the production of a fiber composite according to any of embodiments 40 to 44, wherein the polyether polyol (ii.1) is used in 10% to 50% by weight, based on a total weight of polyisocyanate composition (i) and polyol composition (ii) of 100% by weight.
46. The use of a compact polyurethane having a density of ≥850 g/l for the production of a fiber composite according to any of embodiments 40 to 45, wherein the polyol starter (ii.1.1) of the polyether polyol of (ii.1) is a triol with a functionality of 3, preferably a triol with a functionality of 3 with the exception of glycerol, more preferably is a triol of the formula (I)

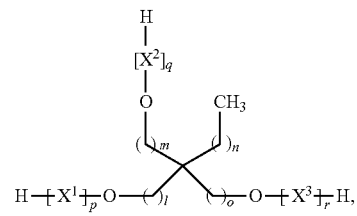

where l, m, n and o are each independently an integer from the range from 1 to 6.
47. The use of a compact polyurethane having a density of ≥850 g/l for the production of a fiber composite according to embodiment 46, where l, m, n and o of the at least one triol (ii.1.1) of the formula (I) are each independently an integer from the range from 1 to 3, preferably l, m, n and o are all 1.
48. The use of a compact polyurethane having a density of ≥850 g/l for the production of a fiber composite according to embodiment 46 or 47, wherein the triol (ii.1.1) has a hydroxyl number in the range from 200 to 2000 mg KOH/g, preferably in the range from 300 to 1850 mg KOH/g, more preferably in the range from 400 to 1850 mg KOH/g.
49. The use of a compact polyurethane having a density of ≥850 g/l for the production of a fiber composite according to any of embodiments 40 to 48, wherein the polyether polyol (ii.1) is based on a triol with the exception of glycerol, preferably on a triol (ii.1.1) of the formula (I) as per embodiment 46 or 47, and more preferably has the formula (II)

where
l, m, n and o are each independently an integer from the range from 1 to 6; p, q and r are each independently zero or an integer from the range from 1 to 6;
and $X^1$, $X^2$ and $X^3$ are each independently a —$CH_2$—$CH(CH_3)$—O— group or a —$CH_2$—$CH(CH_2$—$CH_3)$—O— group, preferably $X^1$, $X^2$ and $X^3$ are each a —$CH_2$—$CH(CH_3)$—O— group.

50. The use of a compact polyurethane having a density of ≥850 g/l for the production of a fiber composite according to any of embodiments 40 to 49, wherein the reaction of (ii.1.1) and (ii.1.2) is performed exclusively in the presence of a boron-based, fluorine-containing Lewis acid catalyst (ii.1.3) and no further alkoxylation catalysts are used.

51. The use of a compact polyurethane having a density of ≥850 g/l for the production of a fiber composite according to any of embodiments 40 to 50, wherein the polyether polyol (ii.1) has no ethylene oxide-based end groups, preferably has exclusively propylene oxide-based end groups and/or butylene oxide-based end groups.

52. The use of a compact polyurethane having a density of ≥850 g/l for the production of a fiber composite according to any of embodiments 40 to 51, wherein the polyether polyol (ii.1) has exclusively propylene oxide-based end groups and/or butylene oxide-based end groups and comprises no ethylene oxide-based groups.

53. The use of a compact polyurethane having a density of ≥850 g/l for the production of a fiber composite according to any of embodiments 40 to 52, wherein the polyether polyol (ii.1) is produced only by the reaction of polyol starter, in particular triol, (ii.1.1) and propylene oxide and/or butylene oxide (ii.1.2) and no further alkylene oxide is used.

54. The use of a compact polyurethane having a density of ≥850 g/l for the production of a fiber composite according to any of embodiments 40 to 53, wherein the polyol composition ii) comprises one or more further polyols, wherein the further polyol(s) is/are exclusively polyols which have been prepared without alkali metal-catalyzed or amine-catalyzed alkoxylation.

55. The use of a compact polyurethane having a density of ≥850 g/l for the production of a fiber composite according to embodiment 54, wherein the residual amount of alkali metal salts in the polyol composition ii) is n<0.5 ppm, based on the total weight of the polyol composition ii).

56. The use of a compact polyurethane having a density of ≥850 g/l for the production of a fiber composite according to either of embodiments 54 and 55, wherein the further polyol(s) is/are selected from the group consisting of hydroxyl-functionalized hydrophobic compounds, oleochemical polyols, polyetherols (polyether polyols) which have been alkoxylated in the presence of boron-containing Lewis acids, optionally polyesterols (polyester polyols) and optionally chain extenders.

57. The use of a compact polyurethane having a density of ≥850 g/l for the production of a fiber composite according to any of embodiments 40 to 56, wherein all polyols of polyol composition (ii) have been prepared without basic or aminic catalyst.

58. The use of a compact polyurethane having a density of ≥850 g/l for the production of a fiber composite according to any of embodiments 40 to 57, wherein the polyol composition (ii) does not comprise any aminic or basic catalysts.

59. The use of a compact polyurethane having a density of ≥850 g/l for the production of a fiber composite according to any of embodiments 40 to 58, wherein filament winding is employed as the production process.

60. The use of a compact polyurethane having a density of ≥850 g/l for the production of a fiber composite according to any of embodiments 40 to 58, wherein vacuum infusion is employed as the production process.

61. The use of a compact polyurethane having a density of ≥850 g/l for the production of a fiber composite according to any of embodiments 40 to 58, wherein resin transfer molding is employed as the production process.

62. The use of a compact polyurethane having a density of ≥850 g/l for the production of a fiber composite according to any of embodiments 40 to 58, wherein pultrusion is employed as the production process.

63. A fiber composite material comprising the following components:
a) a compact polyurethane having a density of ≥850 g/l, obtained or obtainable by reacting at least the components:
i) polyisocyanate composition;
ii) polyol composition, comprising at least one polyether polyol (ii.1) which is obtained or obtainable by reacting
ii.1.1) a polyol starter with a functionality of 3 to 6, preferably 3 or 4,
with
ii.1.2) propylene oxide and/or butylene oxide,
in the presence of a boron-based, fluorine-containing Lewis acid catalyst (ii.1.3);
wherein the polyether polyol (ii.1) has an equivalent molecular weight of 50 to 150 g/mol;
ii.1.4) optionally further auxiliaries and/or additives,
b) fibers which are at least partially embedded in the compact polyurethane.

64. The fiber composite according to embodiment 63, wherein the compact polyurethane is obtained or obtainable by reacting components (i), (ii) and, as additive ii.1.4), at least one deaerator.

65. The fiber composite according to embodiment 63 or 64, wherein the compact polyurethane has a density in the range from 850 to 1250 g/l, preferably a density in the range from 850 to 1100 g/l.

66. The fiber composite according to any of embodiments 63 to 65, wherein the boron-based, fluorine-containing Lewis acid catalyst of (ii.1.3) has the formula $BR^1R^2R^3$, wherein $R^1$, $R^2$ and $R^3$ are each independently selected from the group consisting of fluorine atom, perfluorinated C1 to C10 alkyl radical and perfluorinated C6 to C12 aryl radical, wherein $R^1$, $R^2$ and $R^3$ are preferably identical, wherein the boron-based, fluorine-containing Lewis acid catalyst of (ii.1.3) is more preferably selected from boron trifluoride ($BF_3$), tris(pentafluorophenyl)borane $(C_6F_5)_3B$ and mixtures of $BF_3$ and $(C_6F_5)_3B$, more preferably is tris(pentafluorophenyl)borane.

67. The fiber composite according to any of embodiments 63 to 66, wherein the polyether polyol (ii.1) has a hydroxyl number of more than 400 mg KOH/g, preferably of more than 450 mg KOH/g, more preferably a hydroxyl number in the range from 400 to 1200 mg KOH/g, more preferably in the range from 450 to 1200 mg KOH/g, more preferably in the range from 450 to 1000 mg KOH/g.

68. The fiber composite according to any of embodiments 63 to 67, wherein the polyether polyol (ii.1) has an equivalent molecular weight in the range from 50 to 140 g/mol, preferably in the range from 55 to 135 g/mol, more preferably in the range from 60 to 130 g/mol.

69. The fiber composite according to any of embodiments 63 to 68, wherein the polyether polyol (ii.1) is used in 10% to 50% by weight, based on a total weight of polyisocyanate composition (i) and polyol composition (ii) of 100% by weight.

70. The fiber composite according to any of embodiments 63 to 69, wherein the polyol starter (ii.1.1) of the polyether polyol of (ii.1) is a triol with a functionality of 3, preferably a triol with a functionality of 3 with the exception of glycerol, more preferably a triol of the formula (I)

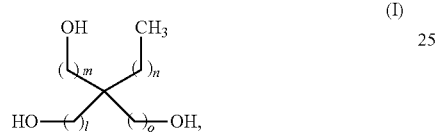

where l, m, n and o are each independently an integer from the range from 1 to 6.

71. The fiber composite according to embodiment 70, where l, m, n and o of the at least one triol (ii.1.1) of the formula (I) are each independently an integer from the range from 1 to 3, preferably l, m, n and o are all 1.

72. The fiber composite according to embodiment 70 or 71, wherein the polyether polyol (ii.1) has a hydroxyl number in the range from 200 to 2000 mg KOH/g, preferably in the range from 300 to 1500 mg KOH/g, more preferably in the range from 400 to 1300 mg KOH/g.

73. The fiber composite according to any of embodiments 63 to 72, wherein the polyether polyol (ii.1) is based on a triol with the exception of glycerol, preferably on a triol (ii.1.1) of the formula (I) as per embodiment 70 or 71, and more preferably has the formula (II)

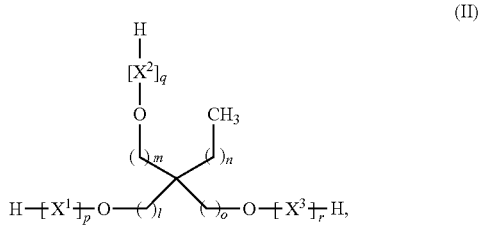

where
l, m, n and o are each independently an integer from the range from 1 to 6; p, q and r are each independently zero or an integer from the range from 1 to 6; and $X^1$, $X^2$ and $X^3$ are each independently a —$CH_2$—$CH(CH_3)$—O— group or a —$CH_2$—$CH(CH_2$—$CH_3)$—O— group, preferably $X^1$, $X^2$ and $X^3$ are each a —$CH_2$—$CH(CH_3)$—O— group.

74. The fiber composite according to any of embodiments 63 to 73, wherein the reaction of (ii.1.1) and (ii.1.2) is performed exclusively in the presence of a boron-based, fluorine-containing Lewis acid catalyst (ii.1.3) and no further alkoxylation catalysts are used.

75. The fiber composite according to any of embodiments 63 to 74, wherein the polyether polyol (ii.1) has no ethylene oxide-based end groups, preferably has exclusively propylene oxide-based end groups and/or butylene oxide-based end groups.

76. The fiber composite according to any of embodiments 63 to 75, wherein the polyether polyol (ii.1) has exclusively propylene oxide-based end groups and/or butylene oxide-based end groups and comprises no ethylene oxide-based groups.

77. The fiber composite according to any of embodiments 63 to 76, wherein the polyether polyol (ii.1) is produced only by the reaction of polyol, in particular triol, (ii.1.1) and propylene oxide and/or butylene oxide (ii.1.2), preferably only by the reaction of triol (ii.1.1) and propylene oxide, and no further alkylene oxide is used.

78. The fiber composite according to any of embodiments 63 to 77, wherein the fibers are selected from glass fibers, carbon fibers, polyester fibers, natural fibers, such as cellulose fibers, aramid fibers, nylon fibers, basalt fibers, boron fibers, Zylon fibers (poly(p-phenylene-2,6-benzobisoxazole)), silicon carbide fibers, asbestos fibers, metal fibers and combinations thereof.

79. The fiber composite according to any of embodiments 63 to 78, wherein the fibers take the form of short fibers, long fibers, continuous fibers, laid scrims, knitted fabrics, random-laid fiber mats and/or plies with identical or different fiber orientation.

80. The fiber composite according to any of embodiments 63 to 79, wherein the polyol composition ii) comprises one or more further polyols, wherein the further polyol(s) is/are exclusively polyols which have been prepared without alkali metal-catalyzed or amine-catalyzed alkoxylation.

81. The fiber composite according to embodiment 80, wherein the residual amount of alkali metal salts in the polyol composition ii) is n<0.5 ppm, based on the total weight of the polyol composition ii).

82. The fiber composite according to embodiment 80 or 81, wherein the further polyol(s) is/are selected from the group consisting of hydroxyl-functionalized hydrophobic compounds, oleochemical polyols, polyetherols (polyether polyols) which have been alkoxylated in the presence of boron-containing Lewis acids, optionally polyesterols (polyester polyols) and optionally chain extenders.

83. The fiber composite according to any of embodiments 63 to 82, wherein all polyols of polyol composition (ii) have been prepared without basic or aminic catalyst.

84. The fiber composite according to any of embodiments 63 to 83, wherein the polyol composition (ii) does not comprise any aminic or basic catalysts.

85. A process for producing a fiber composite, comprising:
1) providing fibers;
2) providing at least the components:
   i) polyisocyanate composition;
   ii) polyol composition, comprising at least one polyether polyol (ii.1) which is obtained or obtainable by reacting ii.1.1) a polyol starter with a functionality of 3 to 6, preferably 3 or 4,
with
ii.1.2) propylene oxide and/or butylene oxide,
in the presence of a boron-based, fluorine-containing Lewis acid catalyst (ii.1.3);
wherein the polyether polyol (ii.1) has an equivalent molecular weight of 50 to 150 g/mol;
ii.1.4) optionally further auxiliaries and/or additives;
3) mixing components i) and ii) of 2) to obtain a reactive mixture;
4) impregnating the fibers with the reactive mixture obtained as per 3);
5) curing the reactive mixture to obtain a fiber composite, wherein the polyurethane is compact and has a density of ≥850 g/l.

86. The process for producing a fiber composite according to embodiment 85, wherein the compact polyurethane has a density in the range from 850 to 1250 g/l, preferably a density in the range from 850 to 1100 g/l.

87. The process for producing a fiber composite according to embodiment 85 or 86, wherein the boron-based, fluorine-containing Lewis acid catalyst of (ii.1.3) has the formula $BR^1R^2R^3$, wherein $R^1$, $R^2$ and $R^3$ are each independently selected from the group consisting of fluorine atom, perfluorinated C1 to C10 alkyl radical and perfluorinated C6 to C12 aryl radical, wherein $R^1$, $R^2$ and $R^3$ are preferably identical, wherein the boron-based, fluorine-containing Lewis acid catalyst of (ii.1.3) is more preferably selected from boron trifluoride ($BF_3$), tris(pentafluorophenyl)borane ($(C_6F_5)_3B$) and mixtures of $BF_3$ and $(C_6F_5)_3B$, more preferably is tris(pentafluorophenyl)borane.

88. The process for producing a fiber composite according to any of embodiments 85 to 87, wherein the polyether polyol (ii.1) has a hydroxyl number of more than 400 mg KOH/g, preferably of more than 450 mg KOH/g, more preferably a hydroxyl number in the range from 400 to 1200 mg KOH/g, more preferably in the range from 450 to 1200 mg KOH/g, more preferably in the range from 450 to 1000 mg KOH/g.

89. The process for producing a fiber composite according to any of embodiments 85 to 88, wherein the polyether polyol (ii.1) has an equivalent molecular weight in the range from 50 to 140 g/mol, preferably in the range from 55 to 135 g/mol, more preferably in the range from 60 to 130 g/mol.

90. The process for producing a fiber composite according to any of embodiments 85 to 89, wherein the polyether polyol (ii.1) is used in 10% to 50% by weight, based on a total weight of polyisocyanate composition (i) and polyol composition (ii) of 100% by weight.

91. The process for producing a fiber composite according to any of embodiments 85 to 90, wherein the polyol starter (ii.1.1) of the polyether polyol of (ii.1) is a triol with a functionality of 3, preferably a triol with a functionality of 3 with the exception of glycerol, more preferably a triol of the formula (I)

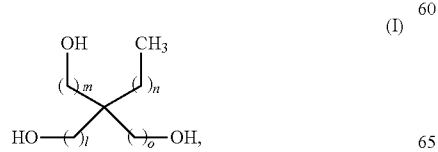

(I)

where l, m, n and o are each independently an integer from the range from 1 to 6.

92. The process for producing a fiber composite according to embodiment 91, where l, m, n and o of the at least one triol (ii.1.1) of the formula (I) are each independently an integer from the range from 1 to 3, preferably l, m, n and o are all 1.

93. The process for producing a fiber composite according to embodiment 91 or 92, wherein the triol (ii.1.1) has a hydroxyl number in the range from 200 to 2000 mg KOH/g, preferably in the range from 300 to 1850 mg KOH/g, more preferably in the range from 400 to 1850 mg KOH/g.

94. The process for producing a fiber composite according to any of embodiments 85 to 93, wherein the polyether polyol (ii.1) is based on a triol with the exception of glycerol, preferably on a triol (ii.1.1) of the formula (I) as per embodiment 91 or 92, and more preferably has the formula (II)

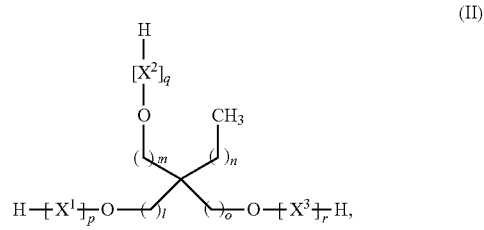

(II)

where
l, m, n and o are each independently an integer from the range from 1 to 6, p, q and r are each independently zero or an integer from the range from 1 to 6;
and $X^1$, $X^2$ and $X^3$ are each independently a —$CH_2$—$CH(CH_3)$—O— group or a —$CH_2$—$CH(CH_2$—$CH_3)$—O— group, preferably $X^1$, $X^2$ and $X^3$ are each a —$CH_2$—$CH(CH_3)$—O— group.

95. The process for producing a fiber composite according to any of embodiments 85 to 94, wherein the reaction of (ii.1.1) and (ii.1.2) is performed exclusively in the presence of a boron-based, fluorine-containing Lewis acid catalyst (ii.1.3) and no further alkoxylation catalysts are used.

96. The process for producing a fiber composite according to any of embodiments 85 to 95, wherein the polyether polyol (ii.1) has no ethylene oxide-based end groups, preferably has exclusively propylene oxide-based end groups and/or butylene oxide-based end groups.

97. The process for producing a fiber composite according to any of embodiments 85 to 96, wherein the polyether polyol (ii.1) has exclusively propylene oxide-based end groups and/or butylene oxide-based end groups and comprises no ethylene oxide-based groups.

98. The process for producing a fiber composite according to any of embodiments 85 to 97, wherein the polyether polyol (ii.1) is produced only by the reaction of polyol starter, in particular triol, (ii.1.1) and propylene oxide and/or butylene oxide (ii.1.2), preferably only by the reaction of triol (ii.1.1) and propylene oxide, and no further alkylene oxide is used.

99. The process for producing a fiber composite according to any of embodiments 85 to 98, wherein the polyol composition ii) comprises one or more further polyols, wherein the further polyol(s) is/are exclusively polyols which have been prepared without alkali metal-catalyzed or amine-catalyzed alkoxylation.

100. The process for producing a fiber composite according to embodiment 99, wherein the residual amount of alkali metal salts in the polyol composition ii) is n<0.5 ppm, based on the total weight of the polyol composition ii).

101. The process for producing a fiber composite according to embodiment 99 or 100, wherein the further polyol(s) is/are selected from the group consisting of hydroxyl-functionalized hydrophobic compounds, oleochemical polyols, polyetherols (polyether polyols) which have been alkoxylated in the presence of boron-containing Lewis acids, optionally polyesterols (polyester polyols) and optionally chain extenders.

102. The process for producing a fiber composite according to any of embodiments 85 to 101, wherein all polyols of polyol composition (ii) have been prepared without basic or aminic catalyst.

103. The process for producing a fiber composite according to any of embodiments 85 to 102, wherein the polyol composition (ii) does not comprise any aminic or basic catalysts.

104. The process for producing a fiber composite according to any of embodiments 85 to 103, wherein the viscosity of the polyol component (ii) at 23° C. is less than 1000 mPas (measured in accordance with DIN 53019-1 to 3).

105. The process for producing a fiber composite according to any of embodiments 85 to 104, wherein the viscosity of the polyol component (ii) at 23° C. is less than 500 mPas (measured in accordance with DIN 53019-1 to 3).

The examples that follow serve to illustrate the invention, but are in no way limiting with respect to the subject matter of the present invention.

EXAMPLES

Chemicals

| Abbreviation | Chemical name |
|---|---|
| Polyol 1 | TMP-started polyol having an OH number (OHN) of 810 mg KOH/g, prepared using KOH as catalyst for the propoxylation |
| Polyol 2 | TMP-started polyol having an OHN of 550 mg KOH/g, prepared using KOH as catalyst for the propoxylation |
| Polyol 3 | TMP-started polyol having an OHN of 550 mg KOH/g, prepared using TPB as catalyst for the propoxylation |
| Polyol 4 | Glycerol-started polyol having an OHN of 550 mg KOH/g, prepared using BF$_3$ as catalyst for the propoxylation |
| Polyol 5 | TMP-started polyol having an OHN of 810 mg KOH/g, prepared using KOH as catalyst for the propoxylation, after chromatographic removal of the KOH |
| Polyol 6 | TMP-started polyol having an OHN of 550 mg KOH/g, prepared using BF$_3$ as catalyst for the propoxylation |
| Polyol 7 | Reaction product of TMP and propylene oxide without catalyst. Minimal conversion |
| Antifoam 1 | Xiameter ACP 1000 Antifoam Compound |
| Zeolite 1 | Zeolite dispersed in castor oil |
| Isocyanate 1 | Mixture of carbodiimide-modified diphenylmethane 4,4-diisocyanate (average functionality 2.2, NCO content 29.5 g/100 g) and isocyanate prepolymer based on diphenylmethane 4,4-diisocyanate, a polyether polyol (22.4-23.4 g/100 g) and dipropylene glycol, weight ratio 1:1, viscosity: 125 MPas at 25° C. |

| Abbreviation | Chemical name |
|---|---|
| TMP | 1,1,1-Trimethylolpropane |
| BF$_3$ | Boron trifluoride |
| TPB | Tris(pentafluorophenyl)borane |

Test Methods:
Viscosity in accordance with DIN 53019-1 to 3
Shore D hardness test in accordance with DIN ISO 7619-1
3-point bending test in accordance with DIN EN ISO 178
Tensile strength in accordance with DIN EN ISO 527
Charpy impact resistance (flatwise) in accordance with DIN EN ISO 179-1/1 fU
Heat distortion temperature: HDT-B-f, flatwise at 0.45 MPa in accordance with DIN EN ISO 75
Hydroxyl number (OH number, OHN): DIN 53240
Density determination (buoyancy method): DIN EN ISO 1183-1

Preparation of Polyols 1 to 7

Polyol 1

Polyol 1 was a glycerol propoxylate having an OH number of 805 mg OH/g and a viscosity of 1275 mPas at 25° C. The polyol was prepared under standard conditions with KOH catalysis. The residual alkalinity was 98 ppm.

Polyol 2

198.72 g of trimethylolpropane and 1.80 g of aqueous KOH solution (50% by weight) were initially charged at 25° C. in a 600 ml reactor. This was then inertized three times with nitrogen. The vessel was heated to 102° C. with stirring and the starter mixture was dried under reduced pressure for 1 h. 250.38 g of propylene oxide were then metered in over 4 h. After a reaction time of 2 h, the reactor was evacuated for 20 minutes under complete vacuum and then cooled down to 50° C. The product obtained (430 g) had the following parameters:
Hydroxyl number (OHN) 559 mg KOH/g
Viscosity (25° C.) 2040 mPas Polyol 3

1191 g of trimethylolpropane and 0.90 g of tris(pentafluorophenyl)borane were initially charged at 25° C. in a 5 l reactor. This was then inertized three times with nitrogen. The vessel was heated to 102° C. with stirring and the starter mixture was dried under reduced pressure for 1 h. 2508 g of propylene oxide were then metered in over 3.5 h. After a reaction time of 2 h, the reactor was evacuated for 20 minutes under complete vacuum and then cooled down to 50° C. The product obtained (4450 g) had the following parameters:
Hydroxyl number (OHN) 547 mg KOH/g
Viscosity (25° C.) 1860 mPas Polyol 4

Polyol 4 was a glycerol propoxylate having an OH number of 55 mg OH/g and a viscosity of 655 mPas at 25° C. The polyol was prepared under cationic catalysis with BF3 etherate (0.11 mass percent based on entire mixture). The reaction temperature was 105° C.

Polyol 5

Polyol 5 corresponded to Polyol 1 with reduced alkalinity. The residual alkalinity was 15 ppm.

Polyol 6

198.9 g of trimethylolpropane and 0.50 g of BF$_3$ etherate were initially charged at 25° C. in a 600 ml reactor. This was then inertized three times with nitrogen. The vessel was heated to 102° C. with stirring. 250.6 g of propylene oxide were then metered in over 3.5 h. After a reaction time of 2 h, the reactor was evacuated for 120 minutes under complete vacuum and then cooled down to 50° C. The product obtained (400 g) had the following parameters:
Hydroxyl number (OHN) 520 mg KOH/g
Viscosity (25° C.) 1195 mPas Polyol 7

198.72 g of trimethylolpropane were initially charged at 25° C. in a 600 ml reactor. This was then inertized three times with nitrogen. The vessel was heated to 102° C. with stirring and the starter was dried under reduced pressure for 1 h. 250.38 g of propylene oxide were then metered in over 4 h. After a reaction time of 32 h, a yield of less than 10% was determined with respect to the addition product of TMP with 3 propylene oxide.

The reaction was stopped as this uncatalyzed reaction regime is not economically usable in industry. Under the same reaction conditions, polyols 1 to 6 are virtually completely converted after a reaction time of 6 hours.

Reference Example 1—Production of Test Sheets from Compact Polyurethane

All starting materials apart from the isocyanate (typical batch size: 300 g of polyol component) were mixed at room temperature under reduced pressure; the isocyanate was then added and the mixture was mixed for 60 s in a Speedmixer (FA Hauschild); the reaction mixture was then cast into a metal mold measuring 20×30×0.4 cm or 20×30×0.2 cm, followed by skimming with a doctor blade to remove the excess resin and curing at 80° C. for 1 h, then at 120° C. for 2 h. After one week of storage at room temperature, test specimens were then milled from the material.

Reference Example 2—Production of a Fiber Composite from Compact Polyurethane and Glass Fibers Using the Filament Winding Process A conventional filament winding unit, situated within a housing with an extraction system, was used. An air humidifier was used to set the desired atmospheric humidity within the enclosure. A bobbin with continuous glass fibers which was mounted inside the enclosure was used. The glass fibers were guided through the as yet unfilled impregnation bath and then laid down on a mandrel via the laying head. The mandrel was mounted at both ends in the rotation device. The impregnation bath and the laying head were located on a carriage by means of which fibers can be laid down over the length of the mandrel. The movement of the carriage, the rotation of the mandrel and the intended laying angle of the fibers on the mandrel as a function of time were programmed and then controlled by the winding software. The glass fibers used were SE3030 glass fibers from 3B (boron-free glass fibers, 17 μm filament diameter, tex 2400 (g/km)). The winding pattern chosen was: 2 circumferential plies, one ply+/−450 and two circumferential plies. The tests were carried out at a temperature of 25° C. and an atmospheric humidity of 85%.

At the start of the test, all starting materials apart from the isocyanate (typical batch size: 100 g of polyol component) were mixed at room temperature; the isocyanate was then added and the mixture was mixed for 60 s in a Speedmixer (FA Hauschild). The material was then filled into the impregnation bath. Thereafter, the roving was manually drawn until the resin-impregnated roving could be laid down onto the mandrel and fixed there. The winding program was then started and a plurality of plies of polyurethane-impregnated glass fibers were laid down on the mandrel. After the winding process was ended, the glass fibers were severed and the material was left to cure for 1 hour at room temperature. Curing was then effected for 1 hour at 80° C. and for 2 hours at 120° C.

The quality of the component surface was visually assessed:
1: smooth surface without microbubbles
2: relatively smooth surface with a few microbubbles
3: large number of microbubbles
4: Rough, foam-like component surface
5: many air bubbles with a diameter >1 mm, white, foam-like component surface Examples 1 to 3—Production of Compact Polyurethanes on the Basis of TMP-Started Polyols which had been Produced Using Fluorinated Borane-Catalysts for the Propoxylation Test specimens and wound polyurethane-impregnated glass fibers were produced according to the procedure of reference example 1 and reference example 2, in each case using TMP-started polyols which had been produced using fluorinated borane catalysts for the propoxylation. Table 1 shows the starting materials and the amounts thereof, and also the properties of the individually obtained polyurethanes and of the obtained fiber composites.

Comparative Examples 1 to 3—Production of Compact Polyurethanes on the Basis of TMP-Started Polyols which had been Produced Using KOH as Catalyst for the Propoxylation Test specimens and wound polyurethane-impregnated glass fibers were produced according to the procedure of reference example 1 and reference example 2, in each case using TMP-started polyols which had been produced using KOH as catalyst for the propoxylation. Table 1 shows the starting materials and the amounts thereof, and also the properties of the individually obtained polyurethanes of comparative examples 1 to 3 and of the correspondingly obtained fiber composites.

TABLE 1

Composition of the polyurethanes of examples 1 to 3 and of comparative examples 1 to 3, and their properties

| | Comp. ex. 1 | Comp. ex. 2 | Ex. 1 | Ex. 2 | Comp. ex. 3 | Ex. 3 |
|---|---|---|---|---|---|---|
| Polyol 1 [% by weight] | 96.8 | 0 | 0 | 0 | 0 | 0 |
| Polyol 2 [% by weight] | 0 | 96.8 | 0 | 0 | 0 | 0 |
| Polyol 3 [% by weight] | 0 | 0 | 96.8 | 0 | 0 | 0 |
| Polyol 4 [% by weight] | 0 | 0 | 0 | 96.8 | 0 | 0 |
| Polyol 5 [% by weight] | 0 | 0 | 0 | 0 | 96.8 | 0 |
| Polyol 6 [% by weight] | 0 | 0 | 0 | 0 | 0 | 96.8 |
| Antifoam 1 [% by weight] | 0.2 | 0.2 | 0.2 | 0.2 | 0.2 | 0.2 |
| Zeolite 1 [% by weight] | 3 | 3 | 3 | 3 | 3 | 3 |
| Isocyanate 1 [% by weight] | 268.14 | 185.1 | 185.1 | 185.1 | 270.2 | 185.1 |
| Index | 120 | 120 | 120 | 120 | 120 | 120 |

TABLE 1-continued

Composition of the polyurethanes of examples 1 to 3 and of comparative examples 1 to 3, and their properties

| | Comp. ex. 1 | Comp. ex. 2 | Ex. 1 | Ex. 2 | Comp. ex. 3 | Ex. 3 |
|---|---|---|---|---|---|---|
| Test specimen | | | | | | |
| Shore D | 85 | 83 | 83 | 83 | 83 | 83 |
| Density [g/l] | 1246 | 1207 | 1209 | | 1210 | 1205 |
| Flexural strength [MPa] | 78 | 101 | 136 | 136 | — | — |
| Tensile strength [MPa] | 35 | 77 | 82 | 82 | — | — |
| Elongation at break [%] | 2 | 4 | 6 | 7 | — | — |
| Tensile modulus of elasticity [MPa] | 3211 | 2940 | 3021 | 3050 | — | — |
| Charpy impact resistance [KJ/m²] | 9.3 | 55.6 | 104.7 | 77.0 | — | — |
| Heat distortion temperature HDT b | 108 | 100 | 95 | 92 | — | — |
| Winding test | | | | | | |
| Tendency to bubble formation in winding test (25° C., 85% atmospheric humidity)* | Strong (4) | Very strong (5) | None (1) | Low (3) | Very strong (5) | Very low (2) |

—: not determined
*Visual assessment of the quality of the component surface

It has been found that the use of a polyol which had been produced by propoxylation from a triol, in particular TMP, under catalysis by a boron-based, fluorine-containing Lewis acid catalyst, in particular tris(pentafluorophenyl)borane, resulted in compact polyurethanes having an improved impact resistance of more than 60, in particular more than 70. In addition, the Shore D hardness was comparable to that of polyurethanes which had been produced using different polyols produced with KOH catalysis. Surprisingly, the compact polyurethanes which had been produced using a polyol which by propoxylation from a triol, in particular TMP, under catalysis by a boron-based, fluorine-containing Lewis acid catalyst, in particular tris(pentafluorophenyl) borane, had markedly improved tensile strength which was greater than 80 MPa.

It has been found in the winding test that the use of compact polyurethanes which had been produced using a polyol, which by propoxylation from a triol, in particular TMP, under catalysis by a boron-based, fluorine-containing Lewis acid catalyst, in particular tris(pentafluorophenyl) borane, was to markedly better results with respect to the avoidance of undesirable bubble formation: in the winding test, despite high atmospheric humidity of 85%, the compact polyurethanes showed at most very minor, if any, bubble formation, whereas the use of polyols produced under KOH catalysis led to foaming, that is to say undesired bubbles formed. The analogous polyol, which was synthesized without catalysis, cannot be prepared economically.

CITED LITERATURE

Guenter Oertel, Polyurethane Handbook: Chemistry—Raw Materials—Processing—Application—Properties—1. January 1994
U.S. Pat. No. 3,464,935 A
T. Miyajima et al., Polymer Journal (2015) 47, 771-778
WO 2016/064698 A1
U.S. Pat. No. 6,531,566 B1
U.S. Pat. No. 6,831,112 B2
JP 2014-167105 A
US 2003/0100623 A1
M. Ionescu, Chemistry and Technology of Polyols, Rapra, 2005, chapter 17.1
M. Ionescu, Chemistry and Technology of Polyols, Rapra, 2005, pp. 67-75
Thomas Brock, Michael Groteklaes, Peter Mischke: *Lehrbuch der Lacktechnologie*. Ed.: Ulrich Zorll, 2nd edition, Vincentz Verlag, Hanover 2000, ISBN 978-3-87870-569-7 chapter 2.4.2.1. Entschäumer und Entlüfter, p. 169 f.
Kunststoffhandbuch, Band 7, Polyurethane, Carl Hanser Verlag, 3rd edition 1993, chapter 3.1
"Kunststoffhandbuch, Band 7, Polyurethane", Carl Hanser Verlag, 3rd edition 1993, chapters 3.4.4 and 3.4.6 to 3.4.11
DE 102008021980 A1
WO 2009/115540 A1
WO 2006/034800 A1
EP 0090444 B1
WO 05/090440 A1
EP1803756 A1
M. Ionescu, Chemistry and Technology of Polyols, Rapra, 2005, p. 119 ff.
M. Neitzel, P. Mitschang, Handbuch Verbundwerkstoffe, Carl Hanser Verlag 2004, p. 164
M. Ionescu, Chemistry and Technology of Polyols, Rapra, 2005, pp. 245-247

The invention claimed is:

1. A compact polyurethane having a density of ≥850 g/l, obtained by reacting at least the components:
   i) a polyisocyanate composition; and
   ii) a polyol composition, comprising at least one polyether polyol (ii.1) which
      is obtained by reacting
         ii.1.1) a polyol starter with a functionality of 3 to 6 with
         ii.1.2) propylene oxide and/or butylene oxide,
         in the presence of a boron-based, fluorine-containing Lewis acid catalyst (ii.1.3), wherein the polyether polyol (ii.1) has an equivalent molecular weight of 50 to 150 g/mol, and
         ii.1.4) optionally further auxiliaries and/or additives.

2. The compact polyurethane according to claim 1, wherein the boron-based, fluorine-containing Lewis acid catalyst of (ii.1.3) has the formula $BR^1R^2R^3$, wherein $R^1$, $R^2$ and $R^3$ are each independently selected from the group consisting of fluorine atom, perfluorinated C1 to C10 alkyl radical and perfluorinated C6 to C12 aryl radical.

3. The compact polyurethane according to claim 1, wherein the polyether polyol (ii.1) has a hydroxyl number of more than 400 mg KOH/g;

and/or wherein the polyether polyol (ii.1) has an equivalent molecular weight in the range from 50 to 140 g/mol.

4. The compact polyurethane according to claim 1, wherein the polyol starter (ii.1.1) of the polyether polyol (ii.1) is a triol with a functionality of 3.

5. The compact polyurethane according to claim 1, wherein the reaction of (ii.1.1) and (ii.1.2) is performed exclusively in the presence of a boron-based, fluorine-containing Lewis acid catalyst (ii.1.3) and no further alkoxylation catalysts are used.

6. The compact polyurethane according to claim 1, wherein the polyether polyol (ii.1) has no ethylene oxide-based end groups.

7. The compact polyurethane according to claim 1, wherein the polyol composition ii) comprises one or more further polyols, wherein the further polyol(s) is/are exclusively polyols which have been prepared without alkali metal-catalyzed or amine-catalyzed alkoxylation.

8. The compact polyurethane according to claim 1, wherein the polyol starter (ii.1.1) of the polyether polyol (ii.1) is a triol of the formula (I)

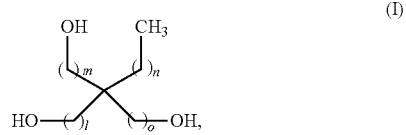

wherein l, m, n and o are each independently an integer from the range from 1 to 6.

9. The compact polyurethane according to claim 1, wherein the boron-based, fluorine-containing Lewis acid catalyst of (ii.1.3) has the formula $BR^1R^2R^3$, wherein $R^1$, $R^2$ and $R^3$ are each independently selected from the group consisting of fluorine atom, perfluorinated C1 to C10 alkyl radical and perfluorinated C6 to C12 aryl radical, wherein $R^1$, $R^2$ and $R^3$ are identical and/or wherein the boron-based, fluorine-containing Lewis acid catalyst of (ii.1.3) is selected from the group consisting of boron trifluoride ($BF_3$), tris (pentafluorophenyl)borane $(C_6F_5)_3B$ and mixtures of $BF_3$ and $(C_6F_5)_3B$.

10. The compact polyurethane according to claim 1, wherein the polyether polyol (ii.1) has a hydroxyl number of more than 450 mg KOH/g and/or the polyether polyol (ii.1) has an equivalent molecular weight in the range from 55 to 135 g/mol.

11. The compact polyurethane according to claim 1, wherein the polyether polyol (ii.1) has exclusively propylene oxide-based end groups and/or butylene oxide-based end groups.

12. The compact polyurethane according to claim 1, wherein the polyol composition ii) comprises one or more further polyols selected from the group consisting of hydroxyl-functionalized hydrophobic compounds; oleochemical polyols, and polyetherols (polyether polyols) which have been alkoxylated in the presence of boron-containing Lewis acids, optionally polyesterols (polyester polyols) and optionally chain extenders.

13. A process for producing a compact polyurethane having a density of ≥850 g/l, comprising the reaction of at least the components:
i) a polyisocyanate composition; and
ii) a polyol composition, comprising at least one polyether polyol (ii.1) which
is obtained by reacting
ii.1.1) a polyol starter with a functionality of 3 to 6 with
ii.1.2)propylene oxide and/or butylene oxide,
in the presence of a boron-based, fluorine-containing Lewis acid catalyst (ii.1.3), wherein the polyether polyol (ii.1) has an equivalent molecular weight of 50 to 150 g/mol, and
ii.1.4) optionally further auxiliaries and/or additives.

14. The process for producing a compact polyurethane having a density of ≥850 g/l according to claim 13, wherein the boron-based, fluorine-containing Lewis acid catalyst of (ii.1.3) has the formula $BR^1R^2R^3$, wherein $R^1$, $R^2$ and $R^3$ are each independently selected from the group consisting of fluorine atom, perfluorinated C1 to C10 alkyl radical and perfluorinated C6 to C12 aryl radical.

15. The process for producing a compact polyurethane having a density of ≥850 g/l according to claim 13, wherein the polyether polyol (ii.1) has a hydroxyl number of more than 400 mg KOH/g;

and/or wherein the polyether polyol (ii.1) has an equivalent molecular weight in the range from 50 to 140 g/mol.

16. The process for producing a compact polyurethane having a density of ≥850 g/l according to claim 13, wherein the polyol starter (ii.1.1) of the polyether polyol of (ii.1) is a triol with a functionality of 3.

17. A compact polyurethane having a density of ≥850 g/l, obtained by the process according to claim 13.

18. A method of using a compact polyurethane having a density of ≥850 g/l, obtained by reacting at least the components:
i) a polyisocyanate composition; and
ii) a polyol composition, comprising at least one polyether polyol (ii.1) which
is obtained by reacting
ii.1.1) a polyol starter with a functionality of 3 to 6 with
ii.1.2) propylene oxide and/or butylene oxide,
in the presence of a boron-based, fluorine-containing Lewis acid catalyst (ii.1.3), wherein the polyether polyol (ii.1) has an equivalent molecular weight of 50 to 150 g/mol, and
ii.1.4) optionally further auxiliaries and/or additives,
the method comprising using the compact polyurethane for the production of a fiber composite.

19. A fiber composite material comprising the following components:
a) a compact polyurethane having a density of ≥850 g/l, obtained by reacting at least the components:
i) a polyisocyanate composition; and
ii) a polyol composition, comprising at least one polyether polyol (ii.1)
which is obtained by reacting
ii.1.1) a polyol starter with a functionality of 3 to 6 with
ii.1.2) propylene oxide and/or butylene oxide,
in the presence of a boron-based, fluorine-containing Lewis acid catalyst (ii.1.3),
wherein the polyether polyol (ii.1) has an equivalent molecular weight of 50 to 150 g/mol, and
ii.1.4) optionally further auxiliaries and/or additives;
and b) fibers which are at least partially embedded in the compact polyurethane.

20. A process for producing a fiber composite, comprising:
1) providing fibers;
2) providing at least the components:
   i) a polyisocyanate composition;
   ii) a polyol composition, comprising at least one polyether polyol (ii.1) which is obtained by reacting
      ii.1.1) a polyol starter with a functionality of 3 to 6 with
      ii.1.2) propylene oxide and/or butylene oxide,
      in the presence of a boron-based, fluorine-containing Lewis acid catalyst (ii.1.3); wherein the polyether polyol (ii.1) has an equivalent molecular weight of 50 to 150 g/mol, and
      ii.1.4) optionally further auxiliaries and/or additives;
3) mixing components i) and ii) of 2) to obtain a reactive mixture;
4) impregnating the fibers with the reactive mixture obtained as per 3); and
5) curing the reactive mixture to obtain a fiber composite, wherein the polyurethane is compact and has a density of ≥850 g/l.

* * * * *